United States Patent [19]
Lo et al.

[11] Patent Number: 5,960,101
[45] Date of Patent: Sep. 28, 1999

[54] EXPERT MATCHER FINGERPRINT SYSTEM

[75] Inventors: Zhen-Ping Peter Lo, Lake Forest; Behnam Bavarian, Newport Coast, both of Calif.

[73] Assignee: Printrak International, Inc., Anaheim, Calif.

[21] Appl. No.: 08/705,745

[22] Filed: Aug. 30, 1996

[51] Int. Cl.[6] .................................................. G06K 9/00
[52] U.S. Cl. .......................................... 382/125; 382/124
[58] Field of Search ..................................... 382/115, 124, 382/125, 127, 312; 356/18, 71; 340/146.3 E, 146.3 Q, 146.3 AE, 820.34; 283/68

[56] References Cited

U.S. PATENT DOCUMENTS

| | | |
|---|---|---|
| 4,083,035 | 4/1978 | Riganati et al. .................. 382/124 |
| 4,135,147 | 1/1979 | Riganati et al. .................. 382/124 |
| 4,151,512 | 4/1979 | Riganati et al. ............. 340/146.3 E |
| 4,156,230 | 5/1979 | Riganati et al. ............. 340/146.3 E |
| 4,646,352 | 2/1987 | Asai et al. ....................... 382/125 |
| 4,876,726 | 10/1989 | Capello et al. .................. 382/124 |
| 5,187,747 | 2/1993 | Capello et al. .................. 382/124 |

FOREIGN PATENT DOCUMENTS

0062066B1  1/1988  European Pat. Off. .

OTHER PUBLICATIONS

Topological Coding of Single Fingerprints (Ph.D Thesis) University of Kent at Canterbury—Aug. 1985.

*Primary Examiner*—Jose L. Couso
*Assistant Examiner*—Duy M. Dang
*Attorney, Agent, or Firm*—Knobbe, Martens, Olson & Bear, LLP

[57] ABSTRACT

A system and method match a search print with one or more file prints stored in a database, wherein each of said prints including minutiae. The system and method receive a minutiae match report which includes a list of file prints which are possible matches with the search print. The minutiae match report is based on at least a comparison of coordinate locations and angles of rotation of the minutiae in the file prints with the minutiae in the search prints. The system and method determine an offset between a first singularity in the search print and a corresponding first singularity in the file print. Additionally, the system and method determines a first angle between at least one singularity in the search print and at least one minutia of the search print. A second angle between a corresponding at least one singularity in the file print and a corresponding at least one minutia of the file print is determined. The first angle and the second angle are compared and a first match indicator is generated based on the offset and the comparison of the first angle and the second angle.

13 Claims, 10 Drawing Sheets

5,960,101

EXPERT MATCHER FINGERPRINT SYSTEM

FIELD OF THE INVENTION

This invention relates to the automatic matching of fingerprints. In particular, this invention relates to an apparatus and method to improve the accuracy of fingerprint matching.

DESCRIPTION OF THE RELATED ART

It has long been known that each person has unique fingerprints. This knowledge has been put to practical use in many applications. Law enforcement organizations use fingerprints to confirm the identity of crime suspects and to learn the identity of unknown suspects from prints left at a crime scene. Fingerprints are also used as identification for gaining access to secured facilities, to receive welfare benefits, for gun permits, motor vehicle records, and health care programs. As computer and scanner technologies have advanced, the benefits of fingerprint identification have been exploited in an increasing number applications by an increasing number of users. High performance computers permit an initial automated matching of a sample set, or search set, of fingerprints against a massive fingerprint database.

A fingerprint is characterized by the curved formation of ridges on a finger. The locations and angular orientation of the ridge endings and ridge bifurcations within the fingerprint uniquely characterize the fingerprint. A ridge ending occurs at the end of a ridge, while a ridge bifurcation occurs where three diverging ridges meet These characteristics are referred to as "minutiae."

Current fingerprint matching systems are typically limited to matching individual minutiae features, such as coordinate position and angle of rotation, as well as features in the immediate vicinity of a given minutia, from a search print with corresponding individual minutiae features in a database file print in determining whether the file print is a match for the search print. This approach has notable deficiencies and drawbacks. Because of the limited types of fingerprint features evaluated by current systems when performing a match, current systems are only capable of producing a large initial match list. The initial match list, based on minutia matching, includes a large number of file fingerprints which have been determined to be possible matches with the search print. The large initial match list and corresponding fingerprints must then be presented to a fingerprint expert for further evaluation. After a time consuming review, the fingerprint expert then identifies if any of the numerous database candidate prints are a true match with the sample prints. The significant participation required of a human fingerprint expert in analyzing the large number of possible matching prints adds to the time, cost, and inaccuracy in conducting fingerprint matching.

SUMMARY OF THE INVENTION

The present invention provides an expert matcher fingerprint system which enhances fingerprint matching accuracy. Minutiae from a file print and minutiae from a search print are compared to determine if they have corresponding coordinates. Those minutiae from the search and file prints which have corresponding coordinates, known as "mated" minutiae, are used in adjusting a match score of the file print. Comparisons of search print and file print fingerprint ridge formation properties, as well as the relationship of the fingerprint ridge formations to mated minutiae, are performed. These comparisons advantageously serve to better identify which file print is a true match for the search print. Thus, the results of these comparisons are used to adjust the match score of the file print.

In a preferred embodiment, a method of matching a search print with one or more file prints stored in a database system, includes the steps of retrieving a file print from the database system, performing a comparison of a first number of ridges between at least a first minutia and a second minutia in the search print to a second number of ridges between at least a corresponding first minutia and a corresponding second minutia in the file print, the corresponding first minutia in the file print having coordinates corresponding to the first minutia in the search print and the corresponding second minutia in the file print having coordinates corresponding to coordinates of the second minutia of the search print. A result based on the comparison is then generated.

In another preferred embodiment, the method of matching a search print with one or more file prints includes the steps of determining an offset between a first singularity in the search print and a corresponding first singularity in the file print, and generating a result based on the offset.

In yet another preferred embodiment, the method of matching a search print with one or more file prints includes the steps of determining a first distance between a singularity in the search print and at least one minutia in the search print, determining a second distance between a corresponding singularity in the file print and at least one corresponding minutia in the file print, and performing a comparison between the first distance and the second distance. A result based on the comparison is then generated.

In still another preferred embodiment, the method of matching a search print with one or more file prints includes the steps of determining a first angle between a singularity in the search print and at least one minutia of the search print, and determining a second angle between a corresponding singularity in the file print and a minutia of the file print corresponding to the at least one minutia in the search print. The first angle and the second angle are compared. A result is generated based on the comparison.

In a preferred embodiment, the expert matcher determines a quantity of minutiae of the search print which are located on a first side of a line defined by a first search print singularity and a second search print singularity. Additionally, the expert matcher determines a quantity of minutiae of the file print which are located on a corresponding first side of a line defined by a corresponding first file print singularity and a corresponding second file print singularity. The quantity of the search print minutiae and the quantity of the file print minutiae are then compared. A second result based on the comparison of the quantity of the search print minutiae and the quantity of the file print minutiae is then generated. The first search print singularity may be a core or a delta.

In another embodiment, the expert matcher performs a comparison of a first classification of the file print with a second classification of the search print.

In yet another embodiment, the expert matcher determines a first length of a file print ridge connecting a first ridge trace minutia to a second ridge trace minutia and also determines a second length of a search print ridge connecting a corresponding first ridge trace minutia to a second ridge trace minutia The expert matcher then compares the file print ridge length and the search print ridge length and generates a result based on the comparison.

Another aspect of the present invention is an expert matcher which retrieves a file print from the database system and selects a set of file print minutiae and a set of search print minutiae, each of the file print minutiae having coordinates corresponding to a respective one of the search print minutiae. A first comparison of a quantity of ridges between a pair of minutiae of the set of the file print minutiae and a quantity of ridges between a corresponding pair of minutiae in the set of the search print minutiae is performed, and a first result is generated. A second comparison of a first property of a ridge in the file print to a first property of a corresponding ridge in the search print is performed and a second result is generated. The ridge properties may be ridge lengths. Additionally, a third comparison of a first classification of the file print with a second classification of the search print is performed, and a third result is generated. The expert matcher also determines a first distance between a singularity in the search print and at least one minutia in the search print set Additionally, the expert matcher determines a second distance between a corresponding singularity in the file print and a corresponding at least one minutia in the file print set. A fourth comparison between the first distance and the second distance is then performed, and a fourth result is generated. The expert matcher then calculates a first match indicator based on the first, second, third, and fourth results and stores the first match indicator.

In still another embodiment of the invention, the expert matcher determines an offset between a location of a singularity in the search print and a location of a corresponding singularity in the file print. A match indicator based on the offset is generated and stored.

In yet another embodiment, the expert matcher determines a first angle between at least one singularity in the search print and at least one minutia in the search print. Additionally, a second angle between a corresponding at least one singularity in the file print and a corresponding at least one minutia in the file print is determined. The first angle and the second angle are compared, and a match indicator based on the comparison of the first angle and the second angle is generated.

Another aspect of the invention is an expert matcher which receives a minutiae match report, including a list of the file prints which are possible matches with the search print. The minutiae match report is based on at least a comparison of coordinate locations and angles of rotation of minutiae in the file prints with coordinate locations and angles of rotation of minutiae in the search prints. An offset between a location of a first singularity in the search print and a location of a corresponding singularity in the file print is determined. Additionally, a first angle between at least one singularity in the search print and at least one minutia in the search print is determined. A second angle between a corresponding at least one singularity in the file print and a corresponding at least one minutia of the file print is determined. The first angle and the second angle are then compared. A match indicator based on the offset and the comparison of the first angle and the second angle is generated.

In a preferred embodiment, the expert matcher determines a quantity of minutiae in the search print which are located on a first side of a line defined by a plurality of search print singularities and determines a quantity of minutiae of the file print which are located on a corresponding first side of a line defined by a corresponding plurality of file print singularities. A comparison of the quantity of search print minutiae and the quantity of file print minutiae is performed. A match indicator based on the comparison of the quantity of the search print minutiae and the quantity of file print minutiae is generated.

In yet another preferred embodiment, the expert matcher performs a file ridge count of ridges interposed between minutiae on the file print, wherein the minutiae on the file print have corresponding minutiae on the search print. A search ridge count of ridges interposed between minutiae on the search print, wherein the minutiae on the search print have corresponding minutiae on the file print, is also performed. The search ridge count is compared to the file ridge count. A match indicator based on the comparison of the search ridge count and the file ridge count is then generated.

In still another preferred embodiment, a first length of a first file print ridge connecting a first of the file print minutiae to a second of the file print minutia is determined. Additionally, a second length of a search print ridge connecting a first search print minutiae to a second search print minutia, wherein the first search print minutia corresponds to the first file print minutia, is determined. A match indicator based on a comparison of the first length and the second length is then generated.

Another aspect of the invention is a system for matching a search print with one or more file prints, each of the search and file prints including minutiae. The system includes a storage device storing file prints. A minutiae matcher is connected to the storage device. The minutiae matcher is configured to generate a minutiae match report comprising a list of the file prints which are possible matches with the search print. An expert matcher is connected to the minutiae matcher. The expert matcher is configured to calculate a score based at least on an offset between a location of a singularity in the search print and a location of a corresponding singularity in the file print. An output device is configured to present the score to an operator and is connected to the expert matcher.

In a preferred embodiment, the expert matcher is configured to determine a first angle between at least one singularity in the search print and at least one minutia in the search print, and to determine a second angle between a corresponding at least one singularity in the file print and a corresponding at least one minutia of the file print. The expert matcher is configured to then compare the first angle and the second angle.

In another preferred embodiment, a system for matching a search print with one or more file prints includes a scanner connected to the minutiae matcher. The scanner is configured to input the search print.

Another aspect of the present invention is a system for matching a search print with one or more file prints. The system includes a first storage device which stores the file prints. An expert matcher is in communication with the first storage device. The expert matcher includes an angle measurement system configured to measure a first angle between at least one singularity in the search print and at least one minutia in the search print and to measure a second angle between a corresponding at least one singularity in the file print and a corresponding at least one minutia in the file print. A comparator is configured to receive the first angle and the second angle. The comparator is further configured to produce a score. A second storage device is configured to store the score is in communication with the expert matcher.

DETAILED DESCRIPTION OF THE PREFERRED EMBODIMENT

Figure 1:
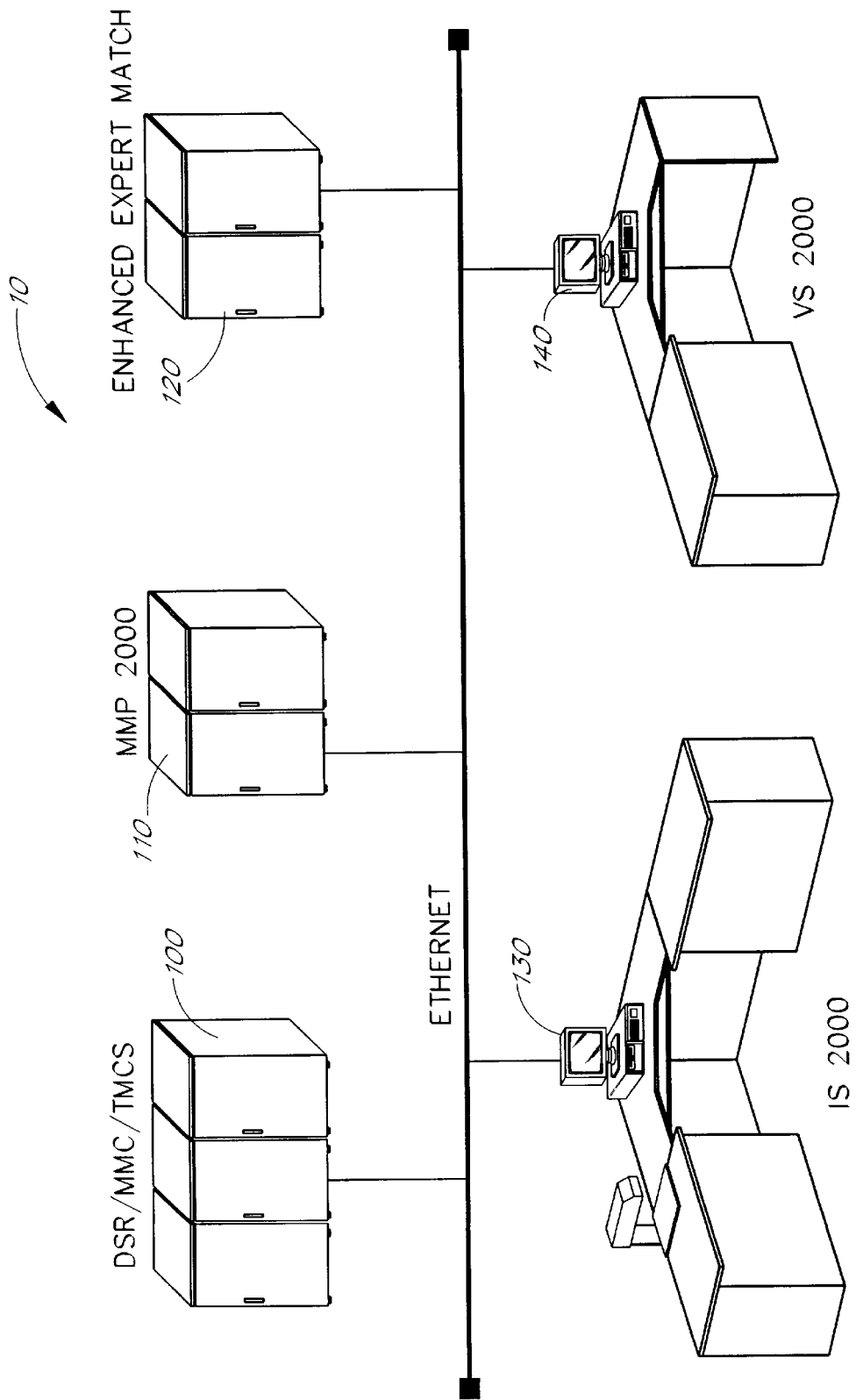
FIG. 1 is a block diagram illustrating a fingerprint matching processing system.
Figure 5A:
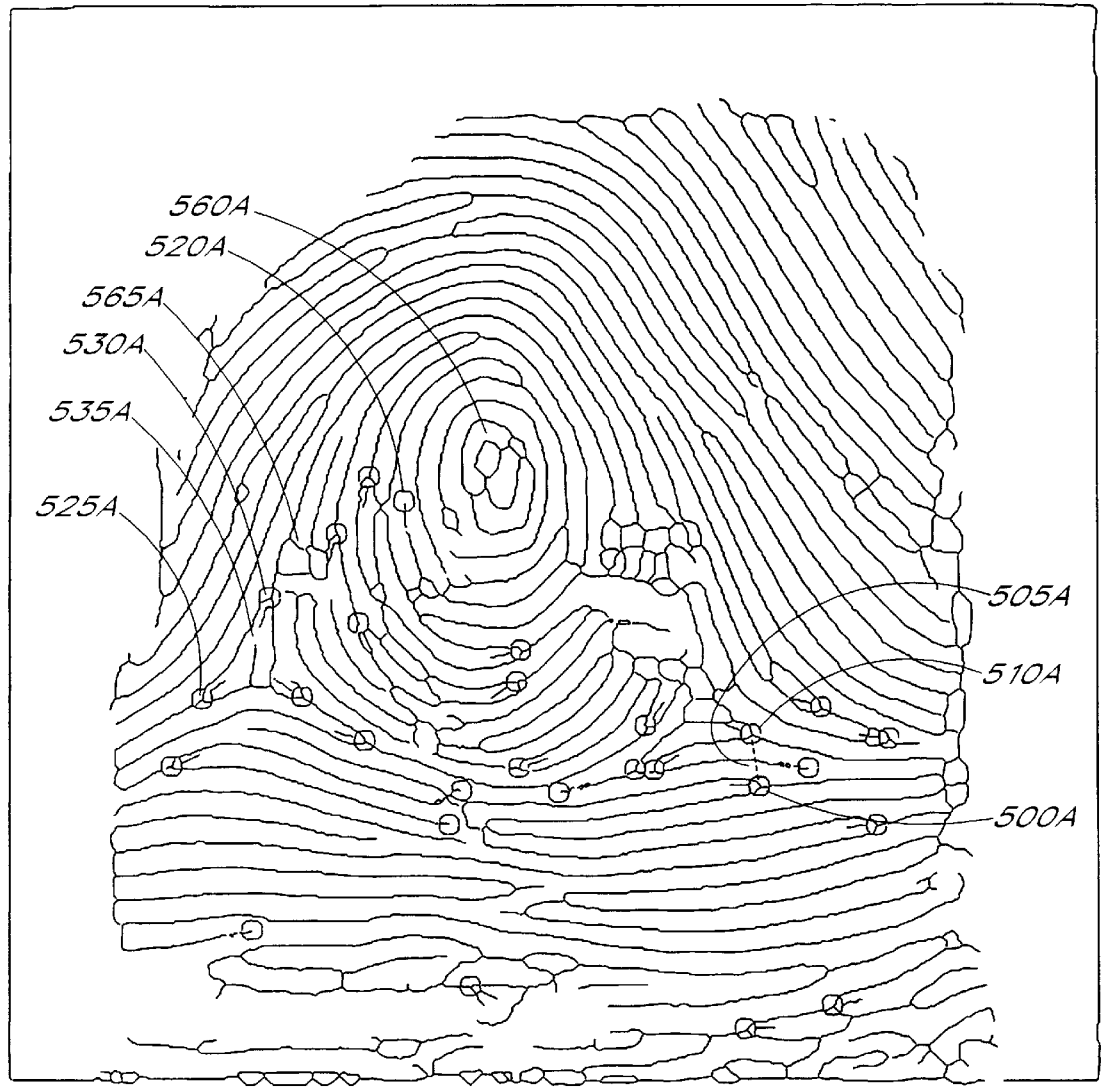
FIG. 5A is a thin search print.

FIG. 1 illustrates a fingerprint matching processing system 10. The system includes a data storage/retrieval system 100 which can store and retrieve fingerprint images, palm prints, and other distinguishing characteristics. In the preferred embodiment, fingerprints will be stored in a "thin" format (FIG. 5A). That is, after the fingerprints are scanned using commercially available scanners, and before the scanned fingerprints are stored in the data storage/retrieval system 100, the fingerprints are image processed. The fingerprint image is enhanced and feature extraction is performed, so that the remaining print image is a skeleton binary representation, with the ridges only one pixel wide, producing a "thin" print image. The thin image preserves all relevant information regarding ridge structure and minutiae information. The relevant information preserved includes position coordinates, direction angles, and minutia type. The thin image is then compressed and stored in non-volatile memory, such as a hard drive, in the data storage and retrieval system. This process results in only the significant fingerprint features, such as minutiae and ridges, being stored, thereby reducing non-volatile memory requirements. The data storage/retrieval system 100 is configured to store and retrieve these images as part of a database using commercially available database management tools.

The fingerprint matching system also includes a minutiae matching processor 110 which performs an initial match of a search print against file prints stored in the large fingerprint database. The fingerprint matching system 10 may optionally include a number of workstations, such as an input station 130, which are used for 10-print card scanning, latent print input, and review of 10-print and latent print search results. The fingerprint system may also include verification stations 140 which are used to review search results by comparing one or more search prints to database prints in determining whether a match has been made. The above-described systems are well known in the art and are currently available from Printrak International, Inc. All of the aforementioned systems may communicate with each other over a communication network, such as an Ethernet bus.

The fingerprint processing system 10 also includes an enhanced expert match system 120 in accordance with the present invention. The enhanced match system 120 may be based on any one of a number of available computer systems, such as an Alpha-based computer system manufactured by Digital Equipment Corporation.

Figure 2:
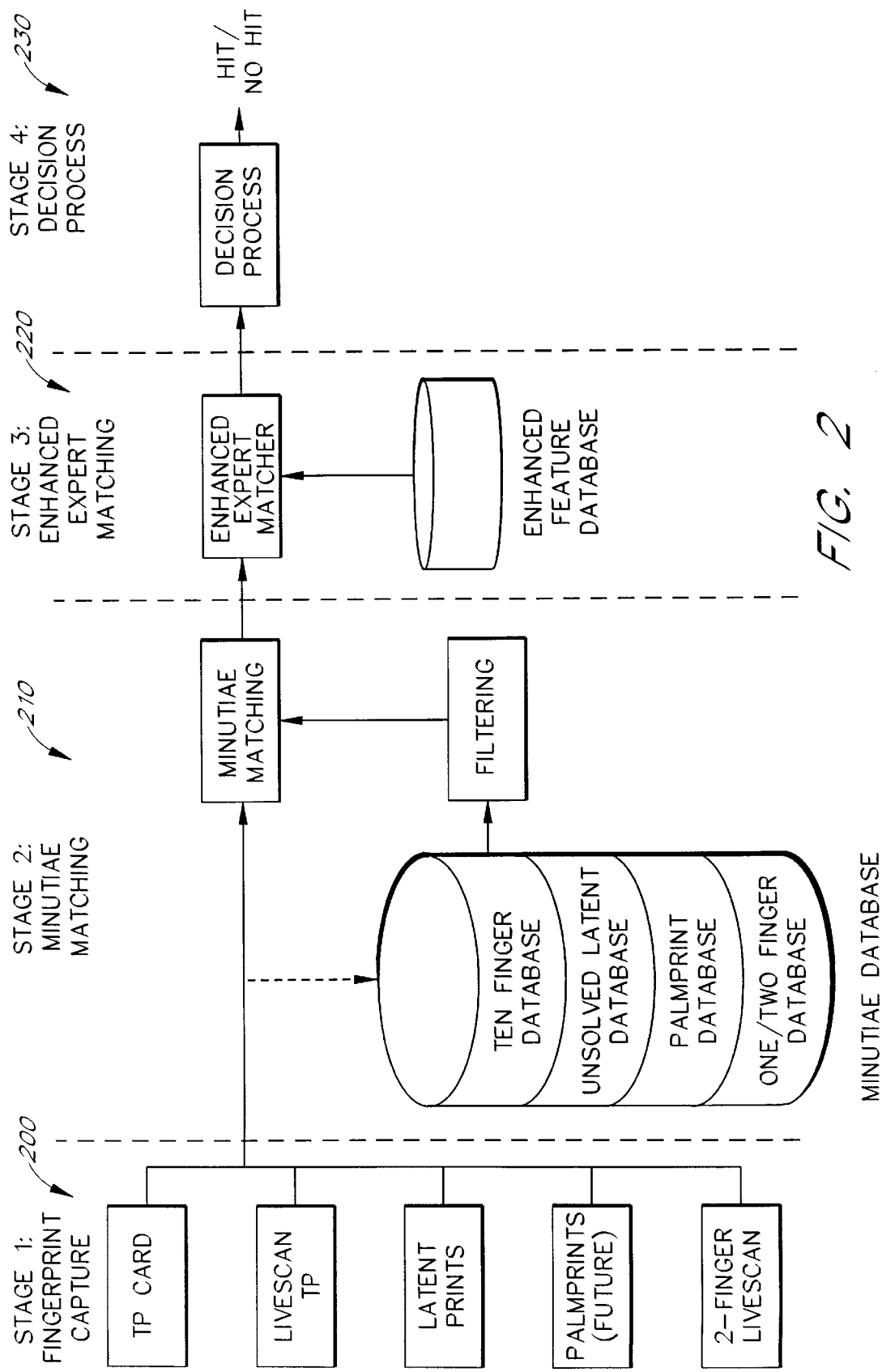
FIG. 2 is a block diagram illustrating the fingerprint matching process.

FIG. 2 illustrates the search processing sequence. In Stage 1 200, search fingerprints are captured. The search fingerprints may be scanned live (i.e., directly from a person's fingers placed on the scanner) or may be scanned from a fingerprint card. Each fingerprint contains minutiae which have respective X-Y coordinate positions and angles of orientation. In Stage 2 210, individual minutiae of each fingerprint sample captured in Stage 1 200 are compared against individual minutiae of the file fingerprints stored in a minutiae database. In particular, the X-Y coordinates and the angles of orientation of minutiae in a search print are compared against the X-Y coordinates and the angles of orientation of minutiae in the file prints in order to determine which file prints are possible matches for the search print. Then, a down-selection process takes place where the matching operation produces an ordered list of possible sets of matching file fingerprints for further evaluation. Each fingerprint set preferably includes at least ten fingerprints, one fingerprint for every finger on both hands.

Figure 5B:
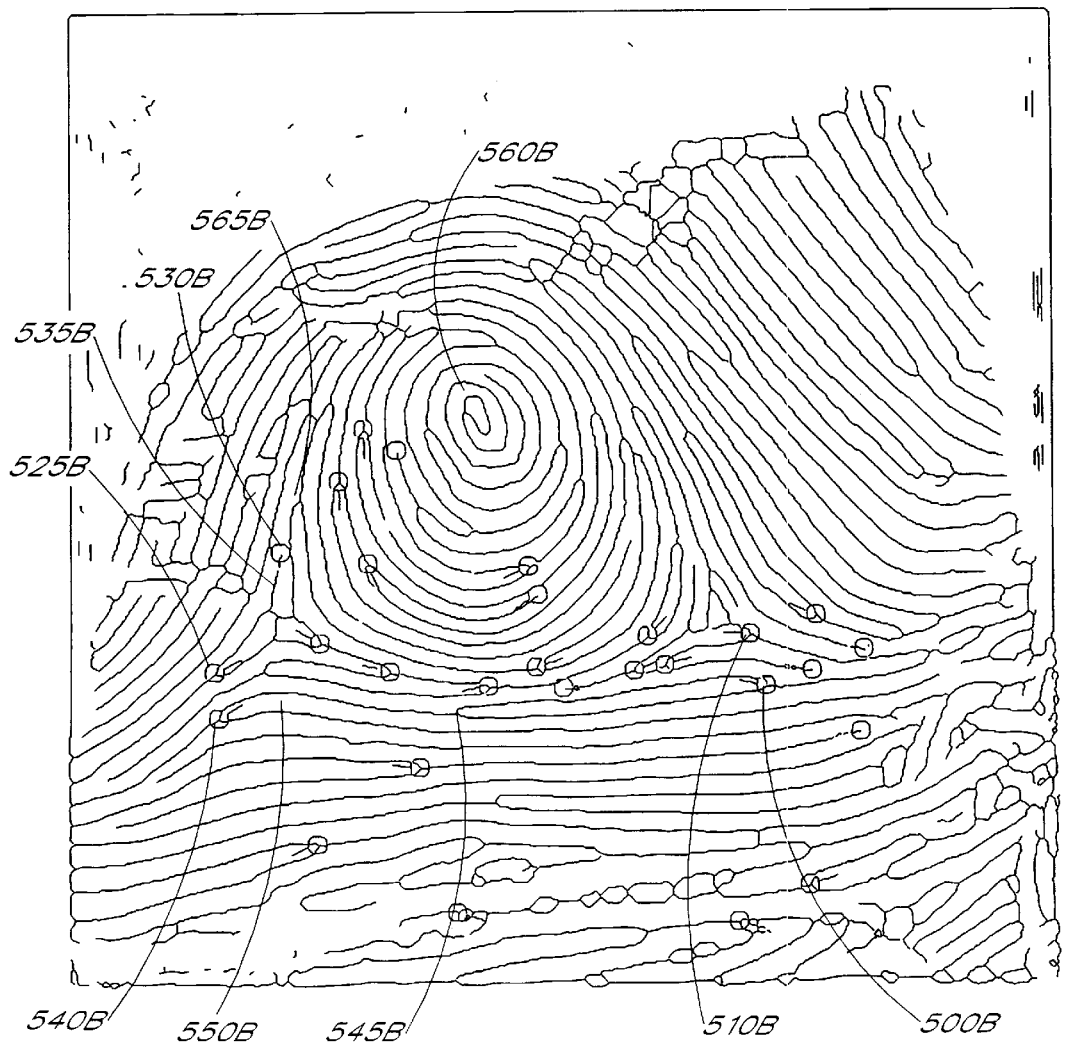
FIG. 5B is a thin file print.

Stage 2 210 also produces a list of mated minutiae for each file print relative to a corresponding search print. A minutia on a file print is termed or categorized as "mated" if there is a corresponding minutia from a search print (FIG. 5A, 500A) that falls on or near the minutiae on the file print (FIG. 5B, 500B) when the search print is figuratively overlaid on the file print. Similarly, a minutia on a search print is termed or categorized as "mated" if there is a corresponding minutia from a file print that falls on or near the minutia on the search print when the search print is figuratively overlaid on the file print, as illustrated by the circled minutiae in FIGS. 5A, 5B. Therefore a mated minutia in the file print has a corresponding minutia in the search print with corresponding coordinates. Thus, in the preferred embodiment of the current invention, the number of mated minutiae in the file print is the same as the number of mated minutiae in the search print. The file print illustrated in FIG. 5B is a true match for the search print illustrated in FIG. 5A.

The analysis which takes place in Stage 3 220 is primarily concerned with these mated minutiae, and with the relationship of the minutiae to each other and to cores and deltas. This approach differs from other known fingerprint matching techniques, which focus on matching file print individual minutiae, as well as features in the immediate vicinity of the file print individual minutiae, with corresponding search print individual minutiae, as well as features in the immediate vicinity of the individual search print minutiae.

However, the elasticity of skin presents poses a problem in determining whether a minutia is a mated minutia Because skin is elastic, two prints made of the same finger will never be identical. Different pressure applied to each finger while making a print results in different twisting and compression of the features which make up a fingerprint. Fingerprint features in a first print of a finger may thus be rotated in position as compared to the same fingerprint features in a second print of the same finger. Thus, before the mating determination can be made, the search print must be rotated and translated in the X and Y plane to ensure that the largest number of minutiae from the search prints have coordinates which are close to the coordinates of minutiae in the file print. The details of this process is described in greater detail in U.S. Pat. No. 4,135,147. The contents of U.S. Pat. No. 4,135,147, in its entirety, is hereby incorporated by reference.

The preferred embodiment of the current invention provides an enhanced, expert matching function in Stage 3 220. Certain features of both the sample fingerprints scanned in Stage 1, as well as the possible print file matches produced by Stage 2 210, are compared using an enhanced, expert matcher and enhanced feature database, as will be described below. In Stage 4 230, a final decision process takes place. The decision process provides a "hit" or "no hit" indication to the operator. The end result of this matching process is an accurate and greatly reduced list of possible hits compared to the prior art. The possible matching prints identified in the greatly reduced list may then be optionally examined by a human fingerprint expert.

Figure 3:
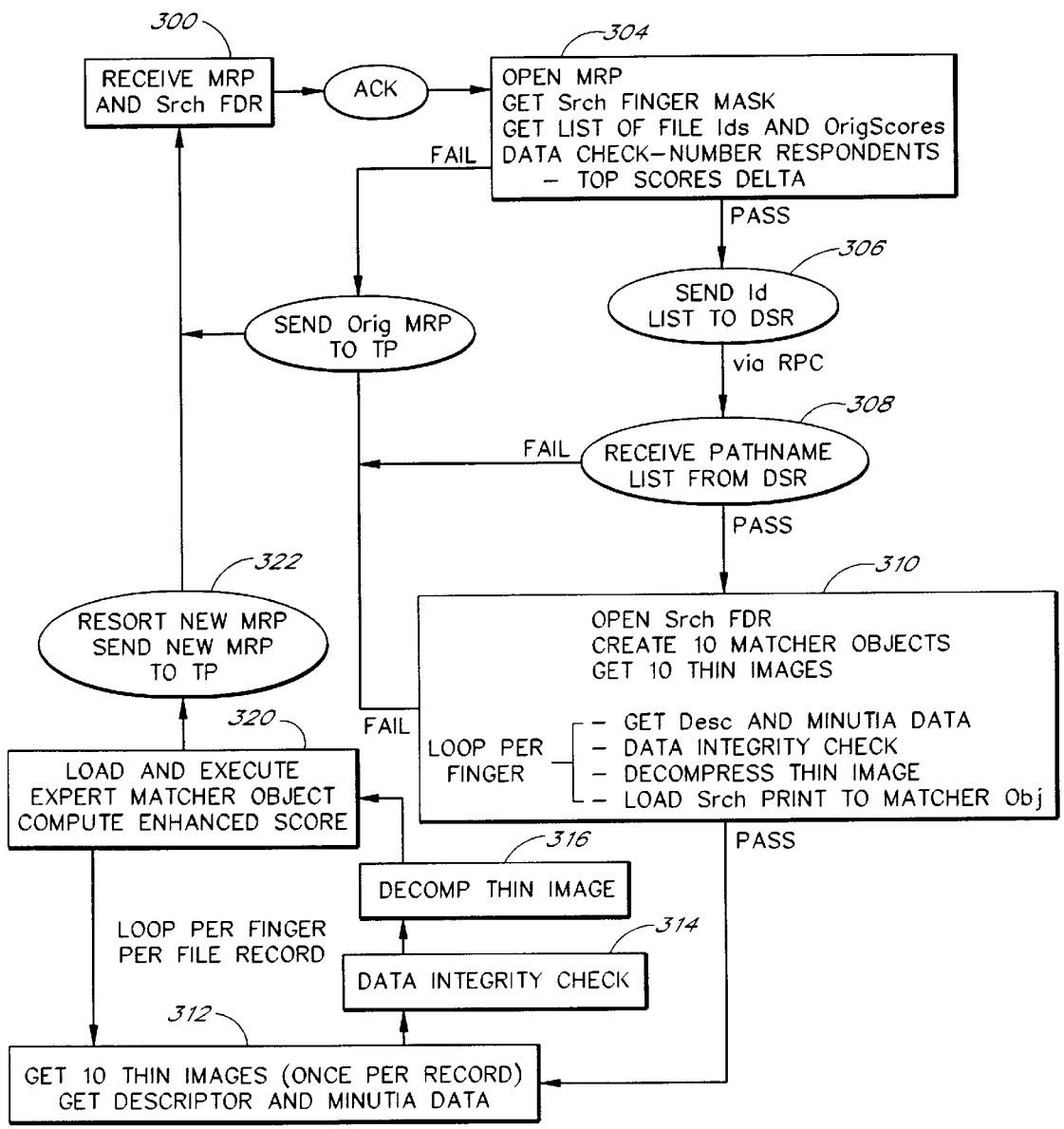
FIG. 3 is a flow diagram illustrating the enhanced, expert matcher process.

FIG. 3 is a flow diagram of the enhanced fingerprint matching process performed in Stage 3 220 of FIG. 2. The enhanced fingerprint matching system first receives a minutiae match report (MRP) and search fingerprint data records (FDR) in a block 300. The fingerprint data records include a minutiae list, as well as descriptors, including image quality, finger number, date of birth, sex, ID number, as well as other descriptors. The fingerprint data record also includes a classification of each print as one of four major print types: arch, left loop, right loop, and whorl. The classification includes both a main classification, that is the classification with the highest probability of being correct, and a reference classification, which classification has the second highest probability of being correct.

In a block 304, the minutiae match report is opened, and a search finger mask, which includes a finger number to which the search print belongs, is retrieved. Additionally, a list of the file IDs for the matching file prints as well as the original scores of the matching file prints, are retrieved.

If the block 304 performs successfully, then the process continues to a block 306, where the ID list produced in the block 304 is sent to the data storage and retrieval system 100, illustrated in FIG. 1. A remote process call is executed in the block 306, and path names of the search prints are retrieved from the data storage and retrieval system 100 in a block 308. The search fingerprint data records (FDR) are then opened in a block 310. A number n of matcher data objects are created, and a like number n of compressed thin images are retrieved. If ten search fingerprints are being matched, n is equal to ten. For each search fingerprint, the system retrieves the descriptors and minutiae data, conducts a data integrity check, decompresses a corresponding thin image, and loads the search fingerprint to a corresponding matcher object. If a failure occurs in any block 304, 308, or 310, the system sends the original minutiae match report back to a transaction processor, which manages the entire system.

Once block 310 is completed, the system uses the pathname list received in the block 308 to load a compressed thin image file print from a set of ten fingerprints identified in the match report produced by Stage 2 210 in FIG. 2. The retrieved thin image file print is the print of a finger corresponding to a finger from the search print file loaded in the block 310. The descriptor and minutiae data associated with the file fingerprint are also loaded. A data integrity check is conducted on the retrieved image, and the thin image is then decompressed.

In a block 320, a corresponding expert matcher object is then loaded with the data retrieved in a block 312, and an enhanced match score is computed based on criteria described below. The process of loading file fingerprints and utilizing the expert matcher to compute an enhanced match score is repeated for every fingerprint of the search print set. The process is then repeated for every set of matching file prints included in the minutiae match report produced in Stage 2 210 of FIG. 2.

The expert matcher then generates a new ordered minutiae match report and sends the new minutiae match report to the transaction processor, as illustrated in a block 322. The transaction processor may then conduct post-processing on the new minutiae match report, and store and/or report the results. A fingerprint expert may optionally examine the results of the expert fingerprint match technique and approve or disapprove the match.

Figure 4:
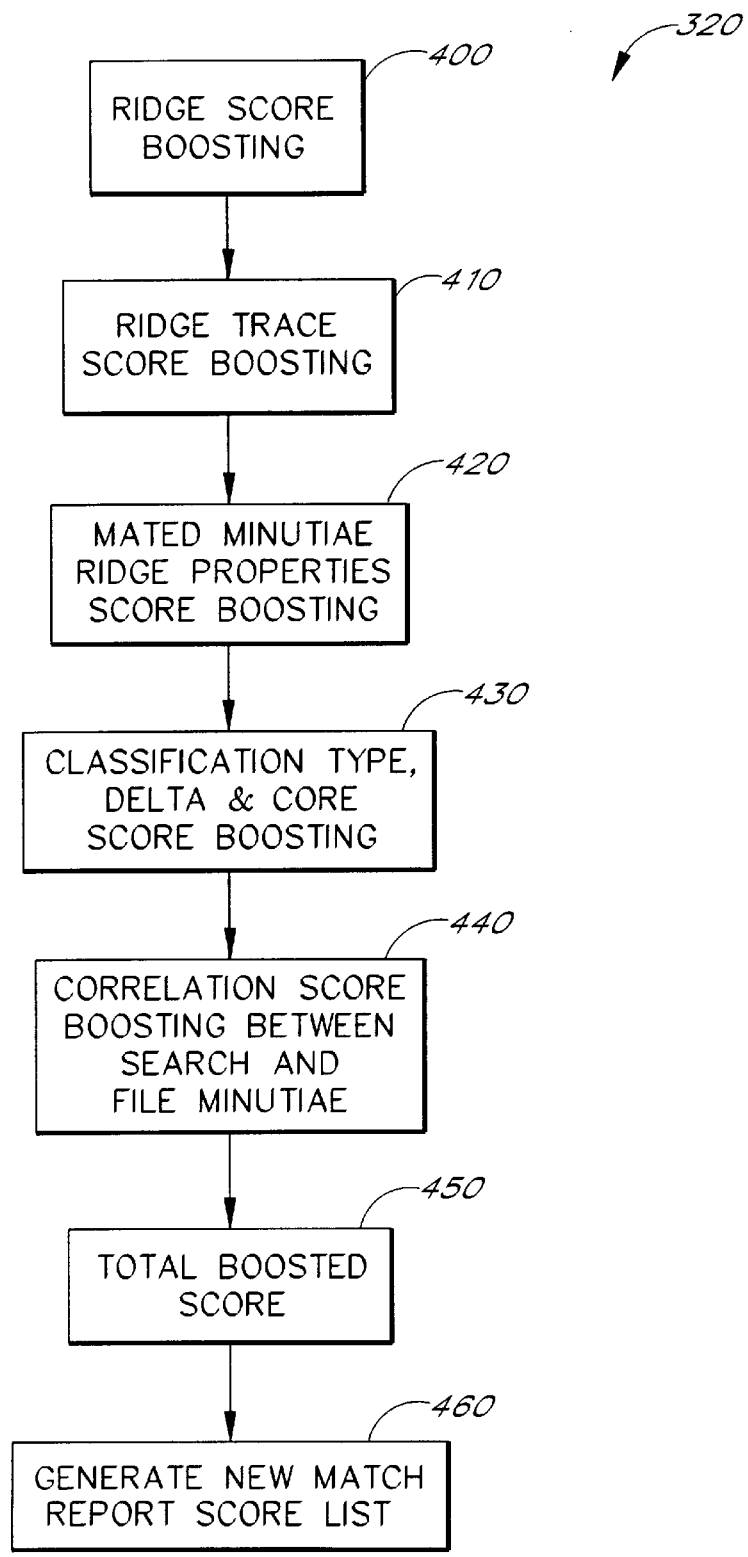
FIG. 4 is a detailed flow diagram of block 320 in FIG. 3.

FIG. 4 is a detailed flow diagram of the expert matcher block 320. While the steps illustrated in FIG. 4 are done sequentially in the preferred embodiment it will be appreciated by one skilled in the art, that these steps could also be performed in parallel. The expert matcher process is primarily a technique to improve the accuracy of fingerprint matching. The expert matcher provides a process that compares or "matches" a large number of fingerprint ridge formations and mated minutiae feature details, beyond the minutiae feature details matched in Stage 2 210 of FIG. 2 by the minutiae matcher. The result of this matching process is an enhanced match score which is a measure of the similarity of the ridge patterns and minutiae types from the search print and the file print, with a high match score indicating a high degree of similarity. The expert matcher examines such fingerprint ridge formation and minutia details as the number of ridges, ridge traces, mated minutiae ridge properties, classification types, deltas, and cores, and also conducts numerical and normalization processing on the search results.

The expert matcher process includes a detailed ridge structure fitting and scoring technique which requires a significantly larger number of computer operations than the standard minutiae matching process illustrated in Stage 2 210 of FIG. 2. Therefore, the expert matcher is a slower process than simple minutiae matching and may not be suitable for use in performing the initial matching of a search print with file fingerprints stored in the massive fingerprint database. Hence, the expert matching technique described below is especially beneficial as a detailed and accurate matching of file prints that have already been identified as possible matches with the search print by the standard, less thorough, minutiae processing in Stage 2 210 of FIG. 2.

The list presented to the expert matching process includes a list of file print candidates which are the most likely matches for a given search print. The list of file prints is generated in a descending order according to their match scores. The minutiae are further examined and classified (FIG. 6, 610) as either ridge ending minutiae (FIG. 5A, 520A) or bifurcation minutiae (FIG. 5A, 500A). For the search print and each matching file print candidate in the list, the expert matcher carries out the steps illustrated in FIG. 4 and calculates a boosted match score using the techniques described below.

Figure 6:
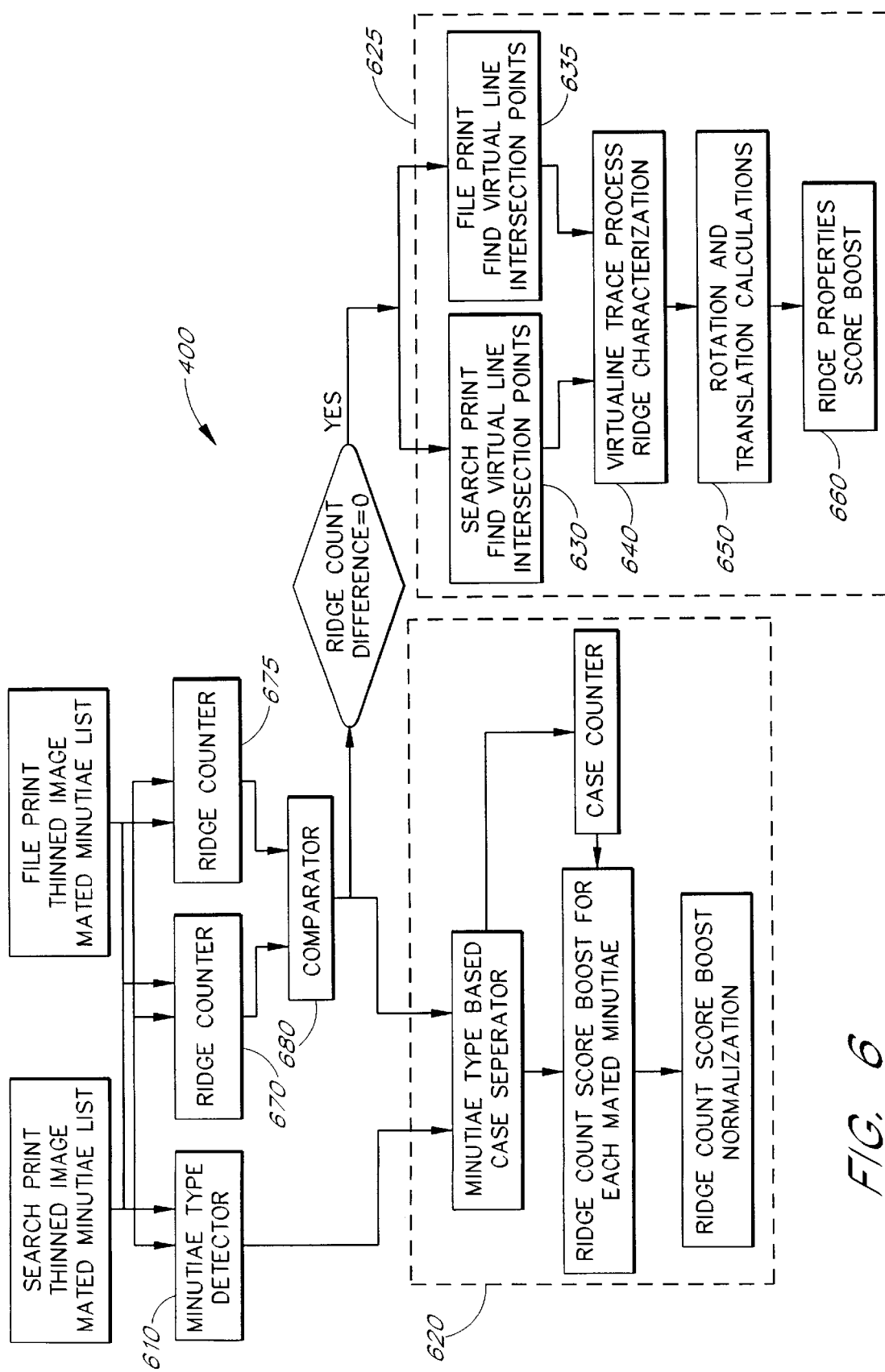
FIG. 6 is a detailed flow diagram of block 400 and block 420 from FIG. 4.

First, a process of ridge count score boosting of the match score determined in Stage 2 210 is conducted in a block 400 as illustrated in FIGS. 4 and 6. This process involves determining the number of ridges between a pair of mated minutiae, including a first minutia that has been categorized as "mated" and a second minutia that has been categorized as "mated". Unlike other ridge counting techniques known in the prior art which count ridges between any neighboring minutiae, in the preferred embodiment of the present invention, ridges between "mated" minutiae are counted.

The procedure for finding the ridge counts between any two minutiae is as follows: A line (FIG. 5A, 505A) is drawn between any first and second minutiae (FIG. 5A, 500A, 510A), each of the minutiae having been categorized as a mated minutia, and the number of ridges intersected by the line are counted. Each ridge is only one pixel wide in the thinned images. A 3-pixel×3-pixel window is applied on the line, and the line is traced using the window, with the 3-pixel×3-pixel window centered on the line. As the window is moved along the line, the color of the pixels underneath the window is checked. Every time the window crosses from a white pixel (binary '0') to a black (binary '1') pixel and back to a white pixel, one ridge has been traversed. A software or hardware counter (FIG. 6, 670, 675) keeps track of the ridge count, i.e., the number of ridges traversed. This process is repeated for all mated minutiae.

Thus, a ridge count is performed on the number of ridges falling between any two minutiae on the file print which have mates on the search print. Similarly, a ridge count is performed on the number of ridges falling between two minutiae (FIG. 5B, 500B, 510B) on the search print which are the mates of the minutiae on the file print. The file print ridge count and search print ridge count are compared (FIG. 6, 680), and the difference in ridge counts between the file ridge count and search ridge count is calculated. This difference is used to calculate a match score reflecting the closeness of the match in ridge counts between the search print and the file print. For example, a difference of 0 indicates a perfect ridge count match for a given pair of file print minutiae as compared to a corresponding pair of search print minutiae. A perfect match in the number of ridges will result in a boost of the matching score.

In any ridge count comparison, four minutiae are involved, two from the search print and two from the file print. Since each minutia may be one of two types, ridge ending or ridge bifurcation, a total of 16 possible combinations of minutiae may be involved in the comparison operation, as illustrated in Table I.

TABLE I

| CASE# | MINUTIAE TYPE SEARCH PAIR | MINUTIAE TYPE FILE PRINT PAIR |
|---|---|---|
| 1 | Ridge Ending-Ridge Ending | Ridge Ending-Ridge Ending |
| 2 | Ridge Ending-Ridge Bifurcation | Ridge Ending-Ridge Ending |
| 3 | Ridge Bifurcation-Ridge Ending | Ridge Ending-Ridge Ending |
| 4 | Ridge Bifurcation-Ridge Bifurcation | Ridge Ending-Ridge Ending |
| 5 | Ridge Ending-Ridge Ending | Ridge Ending-Ridge Bifurcation |
| 6 | Ridge Ending-Ridge Bifurcation | Ridge Ending-Ridge Bifurcation |
| 7 | Ridge Bifurcation-Ridge Ending | Ridge Ending-Ridge Bifurcation |
| 8 | Ridge Bifurcation-Ridge Bifurcation | Ridge Ending-Ridge Bifurcation |
| 9 | Ridge Ending-Ridge Ending | Ridge Bifurcation-Ridge Ending |
| 10 | Ridge Ending-Ridge Bifurcation | Ridge Bifurcation-Ridge Ending |
| 11 | Ridge Bifurcation-Ridge Ending | Ridge Bifurcation-Ridge Ending |
| 12 | Ridge Bifurcation-Ridge Bifurcation | Ridge Bifurcation-Ridge Ending |
| 13 | Ridge Ending-Ridge Ending | Ridge Bifurcation-Ridge Bifurcation |
| 14 | Ridge Ending-Ridge Bifurcation | Ridge Bifurcation-Ridge Bifurcation |
| 15 | Ridge Bifurcation-Ridge Ending | Ridge Bifurcation-Ridge Bifurcation |
| 16 | Ridge Bifurcation-Ridge Bifurcation | Ridge Bifurcation-Ridge Bifurcation |

As can be seen from Table I, the combinations of minutiae divide into two classes, a first class in which the minutia pair types are the same for the search print and the file print (cases 1, 6, 11, and 16), and a second class in which the minutia pair types are different between the search print and the file print (cases 2–5, 7–10, 12–15). These two classes will be used in calculating the ridge count boosting score for the mated minutia pairs (FIG. 6, 620). Ideally, if a file print is a true match for the search print, then for a given pair of search print mated minutiae and a corresponding pair of file print mated minutiae, the minutia pair type should be the same for the search print and the file print. However, due to the twisting of skin, or smudging while taking a print, or due to artificial artifacts resulting from the aforementioned image processing of the prints, a bifurcated minutia on an actual finger may appear as a ridge ending minutia on a skeleton, or thin, image of the fingerprint. Similarly, a ridge ending minutia of an actual finger may appear as a bifurcation minutia on a thin image of the fingerprint. Thus, even when a file print is a true match for the search print, the file print may have mated minutia pairs (FIG. 5B, 525B, 530B) which are of a different type then the corresponding search print mated minutia pairs (FIG. 5A, 525A, 530A).

The procedure used to calculate the ridge count boosting score is as follows. For the first class of minutiae, those wherein the search and file prints have the same types of mated minutiae (cases 1, 6, 11, and 16 from Table I), the boost of the match score is determined by the differences in ridge counts between a given pair of minutiae on the file print as compared to a corresponding pair of minutiae on the search print. The ridge count differences are categorized as: 0, 1, 2, and greater than or equal to 3.

For a ridge count difference of 0 between the search print and the file print, the score boost is directly proportional to the ridge count, as illustrated in Equation 1:

$$\text{RidgeCountScore} = C1 \times (\text{ridge count}) \quad (1)$$

The constant $C1$, as well as other constants referred to below, have been determined through empirical testing and analysis. It should be noted that constants, other than those described below, may also be suitable. $C1$ is a positive number between 0 and 100, and in the preferred embodiment, $C1$ equals 55.

Therefore, the match score (RidgeCountScore) for prints which have a matching number of ridges between minutiae will be significantly boosted, as it is more likely that the matching number indicates a better match of print between the file print and the search print. Having matching numbers of ridges between minutiae occurs with much less frequency in non-matching prints as compared to matching prints. Furthermore, the RidgeCountScore is proportional to the ridge count, because the larger the ridge count the lower the probability of an accidental matching of the ridge counts of the search print and file prints, and thus the higher the probability that the file print is a true match for the search print.

If, on the other hand, the ridge count equals 1, then the score boost is proportional to the lower of ridge counts in the search and file prints, as illustrated in Equation 2:

$$\text{RidgeCountScore} = C2 \times (\text{lower ridge count of search and file print}) \quad (2)$$

where $C2$ is a positive number between 0 and 10, which is set in the preferred embodiment to 2. Since the ridge count of the file print and the search print are not a perfect match, the magnitude of the boost factor is reduced. However, the closeness of the count indicates a higher probability of having a match than would a greater difference in the ridge count between the file and search prints.

If, instead, the ridge count difference between the file print and the search print is equal to 2, the score boost is a constant negative number, as follows:

$$\text{RidgeCountScore} = C3 \quad (3)$$

where $C3$ is a negative number between 0 and −100, which, in the preferred embodiment, is set to −45. This will serve to decrease the score RidgeCountScore for file print mated minutia pairs which have ridge counts which vary significantly from the ridge count of a corresponding search print mated minutia pair.

Similarly, for ridge count differences between the search print and the file print equal to or greater than 3, the score boost is proportional to the ridge count difference, as illustrated in Equation 4:

$$\text{RidgeCountScore} = C4 \times (\text{ridge count difference}) \quad (4)$$

where C4 is a negative number between −100 and −300. In the preferred embodiment, C4 is set to −300. Thus, when the number of ridges between mated minutiae pairs in a file print varies by a significant amount, such as 4, from the number of ridges between corresponding mated minutiae pairs in the search print, the score boost is a negative number so as to significantly decrease the probability of the file print being considered a match with the search print.

If the minutia pairs for the file and search prints are of different types, such as illustrated in Table I (cases 2–5, 7–10, 12–15), different constant values C1–C4 are used in determining the boost score, as described below. If the difference in ridge count between the search print and file print is equal to 0, the score is proportional to the ridge count, as illustrated in Equation 1. However, the constant C1 will be between 0 and 10, and in the preferred implementation, C1 equals 5. Thus, while the score is boosted, it is not boosted nearly as much as in the case where the minutia pairs match between the file and search print. This is because there is a lower probability that the file print is a true match for the search print.

If the ridge count difference is equal to 1, the score boost is proportional to a minimum ridge count of the search and file prints, as illustrated in Equation 2. The constant C2 is between 0 and 15, and in the preferred implementation, the constant C2 equals 6. Note that the constant C2 is set higher for the second class of minutia pairs than for the first class of minutia pairs. This is because if the minutia pair types in the search print and the file print match, then, if the file print is a true match for the search print, the ridge counts of the search prints and the file prints should be an exact match. However, if the minutia pair types in the search print and the file print do not match, this may be merely a result of a poor impression, as illustrated in FIG. 5A, 535A, where, due to skin elasticity, a ridge in the search print may have been twisted to intersect with another ridge, giving the appearance of a bifurcated minutia where none exists. This will result in the search print having a ridge count one less than in the file print. Thus, where the minutia pairs are mismatched due to the aforementioned skin elasticity problem, a ridge count difference of one would be expected if the file print was a true match for the search print. Therefore, when the ridge counts for the search and file minutia pairs are so close, there is a higher probability that the prints match despite the difference in minutia pair types, and so the RidgeCountScore is boosted more.

If the ridge count difference is equal to 2, the score is set to a constant negative number, C3, as illustrated in Equation 3. C3 is between 0 and −100. In the preferred embodiment, C3 equals −20. If the ridge count difference is equal to, or greater than, 3, then the score boost is defined by Equation 4 where C4 is a constant negative number between −100 and −600. In the preferred embodiment, C4 equals −500.

Once the above calculations completed, all the ridge count scores RidgeCountScore are added together and assigned to a variable TotalRidgeCountScore. If the combined ridge count score TotalRidgeCountScore is less than 0, then the score will be set to 0. Otherwise, the score TotalRidgeCountScore will be processed as follows. First, the boosted ridge count score will be normalized based on the number of minutiae evaluated in each of the above prior steps. The normalization is performed according to the following equations:

$$\text{Let } tc(\text{total count}) = c1s1 + c1s2 + c1s3 + c1s4 + c2s1 + c2s2 + c3s3 + c4s4$$

where c1s1 is the number of matching file and search minutia pair types with an identical ridge count; c1s2 is the number of matching file and search minutia pair types with a ridge count difference of 1; c1s3 is the number of matching file and search minutia pair types with a ridge count difference of 2; c1s4 is the number of matching file and search minutia pair types with a ridge count difference equal to, or greater than, 3; c2s1 is the number of non-matching file and search minutia pair types with an identical ridge count; c2s2 is the number of non-matching file and search minutia pair types with a ridge count difference of 1; c2s3 is the number of non-matching file and search minutia pair types with a ridge count difference of 2; c2s4 is the number of matching file and search minutia pair types with a ridge count difference equal to, or greater than, 3.

Then:

$$\text{Let } temp1 = 1 - \frac{c1s1 + c2s4}{tc}$$

$$\text{Let } temp2 = \frac{c1s1}{c1s2 + c1s3}$$

$$\text{Let } temp3 = \frac{c2s1}{c2s2 + c2s3}$$

Then $$\text{RidgeCountBoostScore} = \text{TotalRidgeCountScore} \times (temp1 \times temp2)^2 \times temp3 \quad (5)$$

As can be seen from the above equations, the RidgeCountBoostScore will be decreased appropriately if the ratios of the number of exact count matches c1s1, c2s1 to the respective number of non-exact count matches are small. RidgeCountBoostScore will also be reduced if the ratio of c1s4 plus c2s4 to the total number of minutiae pairs is small. However If $(cs1 < cs2)$ AND $(cs1 < (c1s3 + c1s4))$ Then $$temp4 = \frac{c1s1 + c1s2 + c2s1 + c2s2}{tc}$$

and a new RidgeCountBoostScore is calculated based on the previously calculated RidgeCountBoostScore as follows:

$$\text{RidgeCountBoostScore} = \frac{\text{RidgeCountBoostScore} \times temp4^2}{2} \quad (5\text{A})$$

Thus, RidgeCountBoostScore will be further reduced if c1s1 is less than c1s2 and c1s1 is also less than the sum of c1s3 and c1s4.

Once the normalization process is complete, the expert matcher process will proceed to a block 410 in FIG. 4. Block 410 is illustrated in greater detail in FIG. 7.

Figure 7:
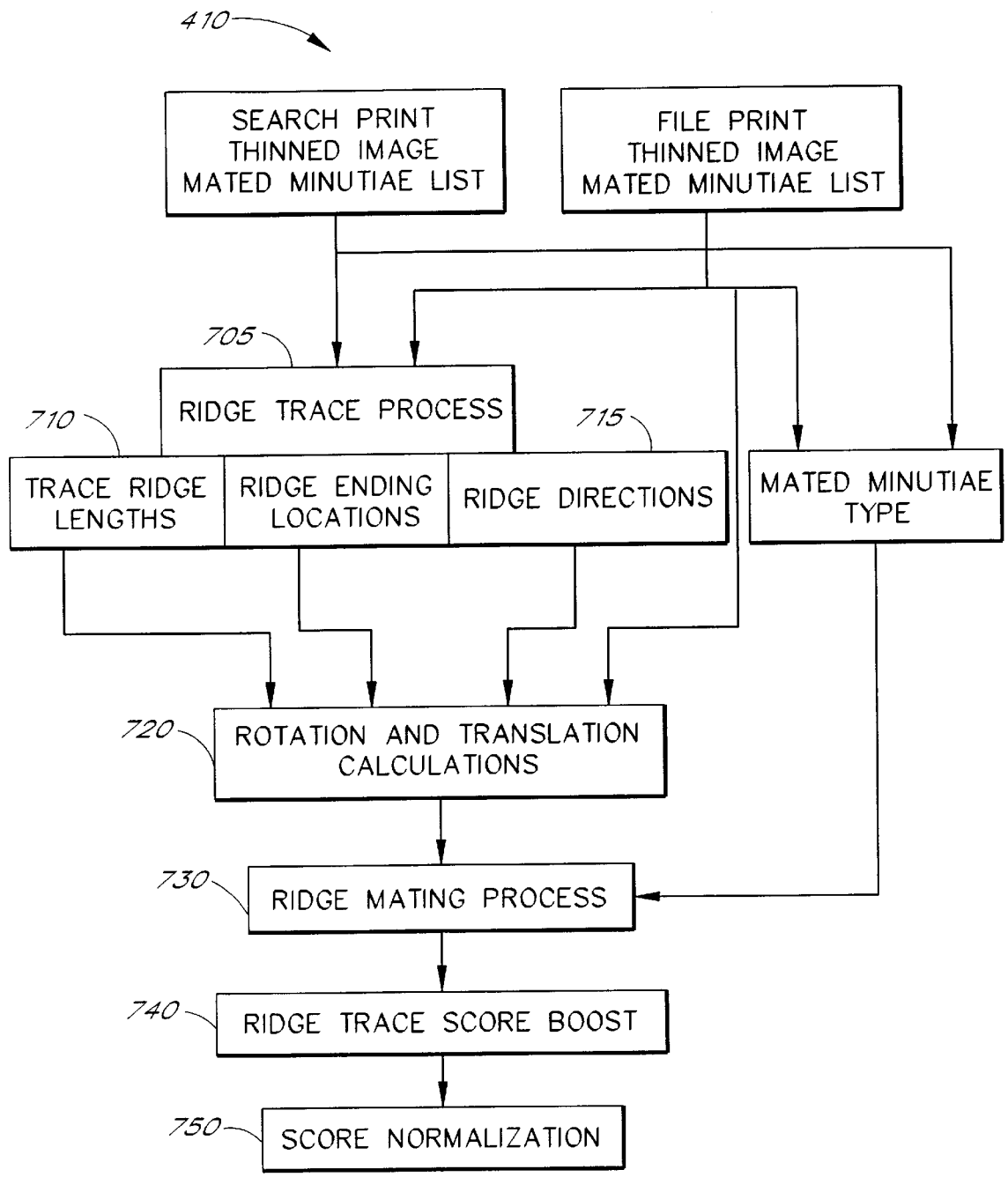
FIG. 7 is a detailed flow diagram of block 410 from FIG. 4.

The process of ridge trace score boosting is performed in the block 410. The ridges being evaluated are connected to at least a first minutia, the first minutia having been characterized as mated. The ridges are traced on the thin images from the first mated minutia on the search print and from a corresponding first mated minutia on the corresponding file print (FIG. 7, 705). For a bifurcated first minutiae (which connects three ridges) (FIG. 5A, 500A), three ridges are traced. For a ridge-ending minutia (which is connected to only one ridge, FIG. 5B, 530B), only one ridge needs to be traced. For each traced ridge, the following will be determined: the ridge ending location, the ridge starting and ending directions, and the trace ridge length. If the traced ridge ending is not a minutia, then it will not be evaluated in this block 410. If, on the other hand, the ridge (FIG. 5B, 550B) is connected to a second minutia (FIG. 5B, 545B), referred to as a traced minutia, the ridge length will be evaluated in the block 410. The traced minutia need not be a mated minutia However, if the first mated minutia is connected by a ridge to a second mated minutia, then the boosted score will be reduced by half, since the ridge will be traced twice, once for each mated minutia.

Next, each mated minutia of the search print will be rotated and translated to ensure proper registration with a corresponding mated minutia of the file print (FIG. 7, 720), according to the following equations:

$$Xr = \cos(\theta) \times Xs + \sin(\theta) \times Ys + \text{deltax} \quad (6)$$

$$Yr = \sin(\theta) \times Xs + \cos(\theta) \times Ys + \text{deltay}$$

where $Xr$ and $Yr$ are the coordinates of the search print minutiae after rotation. $Xs$ and $Ys$ are the coordinates of the search print minutiae before rotation. The angle $\theta$ is the rotation angle, while deltax and deltay are translation parameters. The translation parameters, deltax and deltay, are calculated as follows:

$$\text{deltax} = Xfc - Xsc$$

$$\text{deltay} = Yfc - Ysc \quad (7)$$

In Equation 7, $Xsc$ and $Ysc$ are the coordinates of a centroid of the search print mated minutiae, and $Xfc$ and $Yfc$ are the coordinates of a centroid of the file print mated minutiae. The angle $\theta$ is determined by drawing a line connecting any two minutia points, each minutia having been characterized as "mated," in the search and file prints and finding the angle $\theta$ between the line in the file print and the line in the search print. This process is repeated for a number of mated minutia pairs in order to get an average angle $\theta$. In the preferred embodiment, the above step is performed for up to approximately 40 minutia pairs.

The rotation and translation operation, as described above, is also performed on each traced ridge-ending minutia.

Once the above translation has taken place, a ridge trace score RidgeTraceBoostScore may be calculated (FIG. 7, 740). Each ridge being evaluated in this process connects a pair of minutiae, at least one of the minutia being a mated minutia and the other minutia referred to as a traced minutia The boosted RidgeTraceBoostScore is partly determined by the type of minutia pair the ridge is connected to. A ridge may connect a pair of minutiae where both minutiae are ridge ending minutiae. Alternatively, a ridge (FIG. 5B, 535B) may be connected to a mismatched minutia pair (FIG. 5B, 530B, 525B), where one minutia is a ridge ending minutia, and the other minutia is a bifurcation minutia. Finally, the ridge (FIG. 5A, 535A) may be connected to a matched minutia pair (FIG. 5A, 525A, 530A), where both minutiae are bifurcation minutiae. The ridge trace score boost is calculated for the case where both of the mated minutiae are ridge ending for the search and file prints as follows.

First the length, in pixels, of each ridge which is connected between a minutia pair is determined for both the search print and the file print (FIG. 7, 710). This ridge length determination is accomplished by tracing a given ridge, while keeping track of the number of pixels in that ridge. The ridge length for a given ridge from the search print is assigned to a variable d3, while the ridge length for a corresponding ridge from the file print is assigned to a variable d4.

Next, the distance, measured in pixels, in the X-Y plane between the mated minutia in the file print to the mated minutia in the search print is determined. This distance is assigned to a variable d1. Then the distance in the X-Y plane between the traced minutia in the file print to the corresponding traced minutia in the search print is determined. This distance is assigned to a variable d2. Then the angle difference between the traced ridge starting angles of the search and file prints is determined. This angle difference is assigned to a variable AlphaStart. Next, the angle difference between the traced ridge ending angles of the search and file prints is determined. This angle difference is assigned to a variable AlphaEnd. The starting and ending angles may vary from $+180°$ to $-180°$. Examination of the starting and ending angles reveal whether the traced ridges from the file and search prints proceed in the same direction (FIG. 7, 715). The angles are normalized or scaled utilizing the dimensions of the print image in pixels. Thus, if the print image is 512 pixels by 512 pixels, an angle $\theta'$ is normalized as follows:

$$\text{Normalized } \theta = \theta' \times \frac{512}{360} \quad (8)$$

The ridge trace boost score is then determined by the following calculations:

Let d12=abs(d1–d2)

Let d34=abs(d3–d4)

Let DeltaAlpha=abs(AlphaStart-AlphaEnd)

Then $$\text{RidgeTraceScore} = C9 \times e^{(-C10 \times d12 \times d12)} + (200 - C9 - d12)$$

If (d3<10)OR(d4<10)

Then $$\text{RidgeTraceBoostScore} = C11 \times \text{RidgeTraceBoostScore}$$

Else $$\text{RidgeTraceBoostScore} = \text{RidgeTraceBoostScore} \times e^{(-C10 \times d34 \times d34)} \quad (9)$$

and a new RidgeTraceBoostScore is calculated based on the previously calculated RidgeTraceBoostScore as follows:

RidgeTraceBoostScore=

Ridge TraceBoostScore$\times e^{(-C12 \times DeltaAlpha \times DeltaAlpha)}$ where C9-C12 are positive numbers, and C9 is set between 50 to 200, C10 and C12 are set between 0 to 0.5, and C11 is set between 0 to 1. In the preferred embodiment C9=180, C10=0.005, C12=0.008, and C11=0.5.

Referring to the above Equations 9, the variable d12 is equal to the difference between the relative offsets of the mated minutiae of the file and search prints and the traced minutiae of the file and search prints. Thus, the variable d12 corresponds to the offset between the file traced ridge and the search traced ridge. If the offsets are the same for both the mated minutiae and the traced minutiae, then the boost score RidgeTraceBoostScore may be at a maximum. If, on the other hand, the offsets vary greatly for that of the mated minutiae compared to that of the traced minutiae, then the boost score RidgeTraceBoostScore will be decreased significantly. The variable DeltaAlpha corresponds to the difference in direction between the file print traced ridge and the search print traced ridge. The more similar the directions between the file traced ridge and the search traced ridge are, the greater the boost score RidgeTraceBoostScore is.

Utilization of the $e^{-x}$ function in the above equations causes the boost score RidgeTraceBoostScore to decrease exponentially, or to decrease exponentially plus a variable, with increasing distance differences d12, increasing differences in starting and ending angles DeltaAlpha, and, if d3 or d4 is less than 10, with increasing differences in ridge lengths d34. Thus, if there is not a close match for these elements, the boost score RidgeTraceBoostScore will be heavily penalized, because there is an exponentially lower probability that the prints match. Functions, other then $e^{-x}$, could similarly be used. Alternative suitable functions include decay, Gaussian, and trigonometric functions, as well as other related functions. Linear functions, though not as advantageous as the aforementioned functions, can also be used.

The boost score RidgeTraceBoostScore will be further boosted in proportion to the length of the traced ridge. The longer the ridge the greater the boost. The rational for this boost is that the longer the traced ridge, the less likely the ridge on the file print will match the length of the corresponding ridge on the search print unless the file and search prints were themselves a match. The boost is calculated as follows:

Let md=the minimum of d3 and d4

If (md$\geq$40 AND md$\leq$60)

Then RidgeTraceBoostScore=$C13 \times$RidgeTraceBoostScore

Else If (md$\geq$60 AND md$\leq$80)

Then RidgeTraceBoostScore=$C14 \times$RidgeTraceBoostScore

Else If md$\geq$80

Then RidgeTraceBoostScore=$C15 \times$RidgeTraceBoostScore     (10)

where C13, C14, C15 are positive numbers between 1 to 3, C13 is less than C14, and C14 is less than C15. In the preferred embodiment C13 is set to 1.1, C14 is set to 1.2, and C15 is set to 1.3.

The boost score RidgeTraceBoostScore may be further boosted if the boost score RidgeTraceBoostScore rises above certain threshold, as illustrated in the following equations:

If (RidgeTraceScore>0.75$\times$C9)

Then RidgeTraceScore=$C16 \times$RidgeTraceScore

Else If
((RidgeTraceScore>0.5$\times$C9) AND (RidgeTraceScore<0.75$\times$RidgeTraceScore))

Then RidgeTraceScore=$C17 \times$RidgeTraceScore     (11)

where C16 and C17 are positive numbers between 1 to 10. In the preferred embodiment C16 is set to 3 and C17 is set to 1.6. This operation serves to further distinguish the scores of those file prints who have a high degree of matching ridge and minutia factors over file prints with a lower degree of matching factors.

A ridge trace boost score RidgeTraceBoostScore is now calculated for the minutia pair case where one minutia is a ridge ending minutia and the other minutia is a bifurcation minutia. The case where one minutia is a bifurcation minutia is more difficult than the previous case where both minutiae were ridge ending. This is because a bifurcation minutia connects three ridges, all of which must be traced, while a ridge ending minutia is connected to only one ridge.

Before calculating the ridge trace score boost in the case where one minutia is a ridge ending minutia and the other minutia is a bifurcation minutia, a ridge mating procedure must be performed. The ridge mating procedure attempts to match a ridge in the file print to a corresponding ridge in the search print.

First, for a given minutia the shortest ridge length difference between a ridge connecting to the ridge ending minutia and the three ridges connecting to the bifurcation minutia is determined. An index number x1 of the bifurcation ridge which has the smallest difference in length as compared to the ridge connecting to the file end minutia is recorded. Next, the shortest distance between a transformed traced ridge ending point of the ridge ending minutia and the three transformed traced ridge ending points of the bifurcation minutia is determined. An index number x2 of the bifurcation ridge which has the shortest distance to the transformed traced ridge ending point of the ridge ending minutia is recorded. If the bifurcation ridge whose index number x1 was recorded is the same as the same as the bifurcation ridge whose index number x2 was recorded, then the mated ridge is found.

Otherwise, an angle Alpha1 between a traced ridge ending angle of the ridge ending minutia and a ridge ending angle of the ridge x1 will be determined. Then the angle Alpha2 between the traced ridge ending angle of the ridge end minutia and the ridge ending angle of x2 is determined as follows:

If ((Alpha1>Alpha2) AND ((d2+K1)<d1))

Then x2 is the mated ridge

Else If((Alpha1>Alpha2) AND ((d2+K1)<d1))

Then x2 is the mated ridge,

Else If ((Alpha1<Alpha2) AND ((d2+K1)$\geq$d1))

Then x2 is the mated ridge,

Else If ((alpha1>alpha2) AND (d1$\leq$(d2+K1)))

Then x1 is the mated ridge where Alpha1 and Alpha2 are normalized using Equation 8. The constant K1 in the preferred embodiment has been set to 15. The value of the constant K1 has been determined empirically as a typical variation in distance attributable to skin elasticity. Thus, when two prints are taken from the same finger, the distances will commonly vary between singularity point and singularity point due to differences in the way pressure was applied to the finger while taking the print or differences in the way the fingerprint was rolled on the print card while taking the print.

After the mated ridges are found, the RidgeTraceBoostScore is calculated as in the case where both minutiae are ridge ending minutia, illustrated above in Equations 9, 10. The resulting ridge trace boost score is normalized (FIG. 7, 750). The normalization will further boost the RidgeTraceBoostScore if the ridge trace score is higher than a certain threshold. This further distinguishes those file prints which have a higher probability of matching the search prints. The normalization is performed according to the following formulas:

If (RidgeTraceBoostScore>0.75×C9)

Then RidgeTraceBoostScore=$C18$×RidgeTraceBoostScore

Else If (RidgeTraceBoostScore>0.5×C9)

Then RidgeTraceBoostScore=$C19$×RidgeTraceBoostscore where C18 and C19 are positive numbers between 1 to 10 and C18 is greater then or equal to C19. In the preferred embodiment C18=2 and C19=1.4. Thus, if RidgeTraceBoostScore is greater than 75% of the constant C9, the RidgeTraceBoostScore will be boosted by the multiplier constant C18. If, instead, the RidgeTraceBoostScore is greater than 50% of the constant C9, the RidgeTraceBoostScore will be boosted by the smaller multiplier constant C19. If, however, the boost score RidgeTraceBoostScore is less than, or equal to 50% of the constant C9, the RidgeTraceBoostScore will not be further boosted.

For the minutia pair case where both minutiae are bifurcation minutiae, the ridge mating procedure outlined above is performed for all three ridges connecting the bifurcation minutiae. A corresponding boost score, Score1, Score2, Score3, for each of the mated ridges is then calculated using the equations 9, 10 for each of the three mated ridges. Then resulting ridge trace boost scores, Score1, Score2, and Score3 are normalized as illustrated in the following formulas:

if ((Score1>0.65×C9 AND Score2>0.65×C9) AND (Score3>0.65×C9))
Then

RidgeTraceBoostScore=$C20$×(Score1+Score2+Score3)

Else If two ridge scores are greater than 0.65×C9
AND one ridge score is less than 0.2×C9
Then RidgeTraceBoostScore=$C21$×(Score1+Score2+Score3)

Else If ((one ridge score is greater than 0.65×C9)
AND (two ridge scores are less than 0.2×C10))

Then RidgeTraceBoostScore=$C22$×(Score1+Score2+Score3)

Else

RidgeTraceBoostScore=$C23$×(Score1+Score2+Score3)

where C20–C23 are positive numbers between 0 to 5. In the preferred embodiment, C20=1.6, C21=1.1, C22=0.4, and C23=0.8. Thus, as examination of the above equations reveals, the greater the number of matching boost scores Score1, Score2, Score3 for the three bifurcation ridges, the higher the score RidgeTraceBoostScore. This is because the greater the number of matching boost scores, the higher the probability that the file print is a true match for the search print.

Next, if the ridge count determined in block 400 is an exact match for the file print and search print, the RidgeTraceBoostScore will be further boosted depending on the degree a selection of ridge properties, including ridge length difference, ridge ending difference angle, and ridge ending position, match (FIG. 6, 625).

First, an examination of the ridges lying between two mated minutiae and intersected by the previously drawn lines is made (FIG. 6, 630, 635). As discussed above, a line is drawn between mated minutiae in both the file print and the search print. The intersection points with the ridges lying between the mated minutiae are then determined (FIG. 6, 635). At the intersection point of each line with each ridge there may be a minutia point. The minutia point may be either a ridge ending minutia or a bifurcation minutia. Alternatively, each line may merely intersect a ridge as opposed to a minutia point. Each ridge is then traced from the intersection point in opposite directions of the intersection point (FIG. 6, 640). The traced ridges' ending directions and ridge lengths from the intersected points are determined. The aforementioned ridge ending directions and ridge lengths will be used in evaluating if the file print is a possible match for the search print, as discussed below.

Next, the descriptors loaded from Stage 2 210 in FIG. 2 are examined to determine whether the traced ending points are true minutiae or false minutia A false minutia is a minutia that is the result of a smudge or poor impression caused when the fingerprint was originally taken. If the minutiae are true minutiae, then the intersected points and trace ridge ending points of the search print are transformed as described in Equation 6 (FIG. 6, 650). Then ridge length differences, ridge ending angle differences, and ridge ending position differences are calculated by comparing the direction, the ending position, and the traced length, of each traced ridge between the file print and the search print.

A RidgePropBoostScore is calculated (FIG. 6, 660) based on the ridge length difference (ridge_len_diff), the ridge ending angle difference (angle_diff), and the ridge ending position difference (end_posi_diff), as follows:
(–$C25$×ridge_len_diff×angle_diff×end_posi_diff)

where C24 and C25 are positive numbers and C24 is between 0 to 100, and C25 is between 0 and 1. In the preferred embodiment, C24=20 and C25=0.0005.

Thus, when a file print has matching ridge counts as compared to the search print, the RidgePropBoostScore of the matching file print will be further boosted if it has ridge properties similar to the ridge properties of the corresponding search print. If, however, the ridge properties of the file print differ from the ridge properties of the search print, the RidgePropBoostScore will decrease at an exponential rate. The RidgePropBoostScore may be optionally normalized by further boosting the RidgePropBoostScore if it exceeds a given threshold.

Next, classification type, delta, and core score boosting is performed. In the preferred embodiment of the current invention, the relationships of all mated minutiae to cores (FIG. 5A, 560A, FIG. 5B, 560B) and deltas (FIG. 5A, 565A, FIG. 5B, 565B) are examined, as will be described below.

Figure 8:
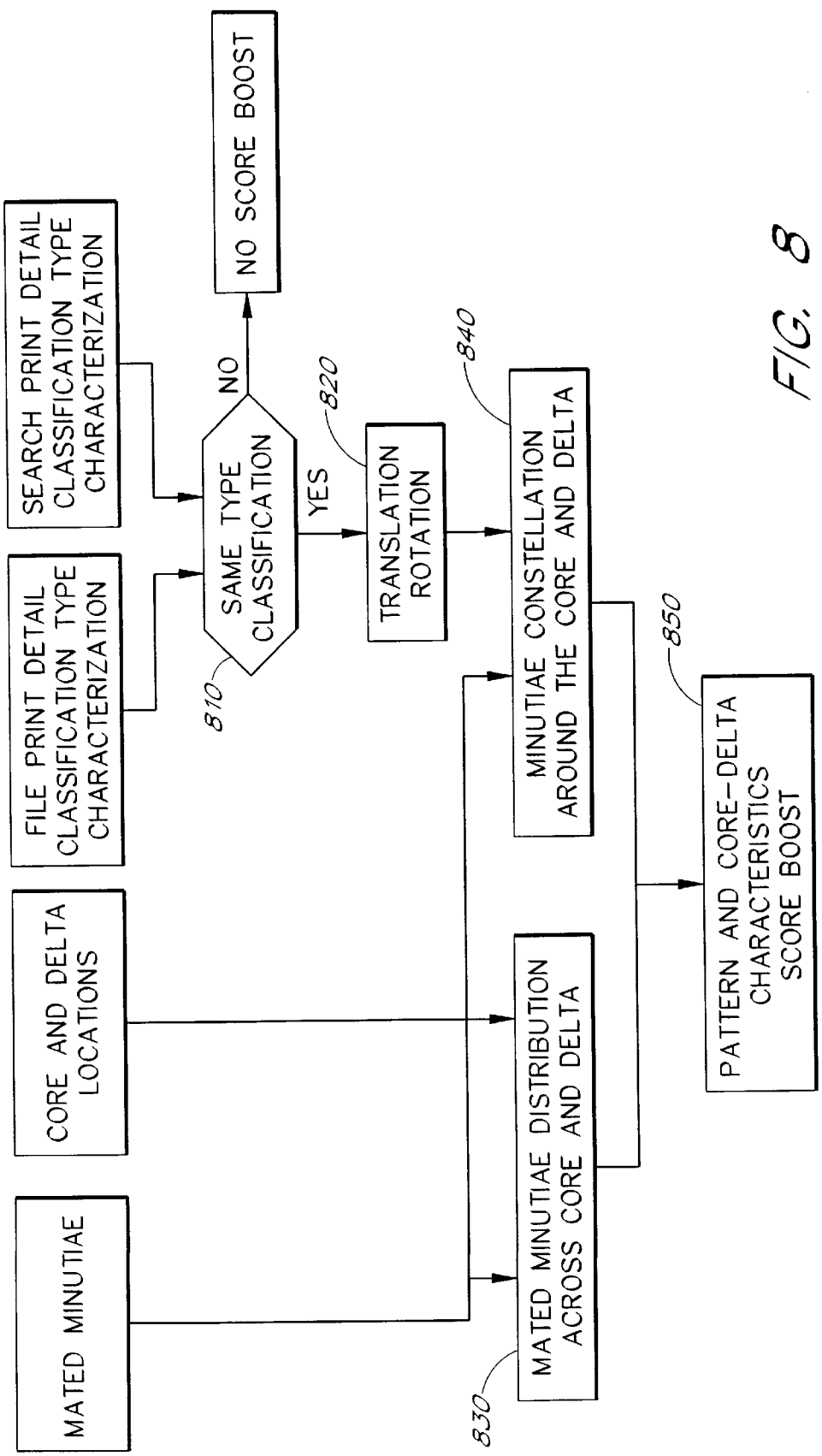
FIG. 8 is a detailed flow diagram of block 430 from FIG. 4.

In Stage 2 210 of FIG. 2, each print was given both a primary classification and a reference classification. The classification types include a whorl class, a left loop class, a right loop class, and an arch class. Other class types may also be included. A primary classification is the classification with the highest probability of being correct, while a reference classification is the classification with the second highest probability of being correct. If the primary class for a given print is the same for both the search print and the file print, or if the reference class of the search print to the primary class of the file print is the same, or if the primary class of the search print is the same as the reference class of the file print, then a classification, delta and core boost score (ClassBoostScore) will be boosted (FIG. 8, 810). Otherwise, the classification boost score ClassBoostScore will not be boosted further.

First, core and delta positions are transformed based on the previously calculated θ, deltax, and deltay for the search print (FIG. 8, 820). A fingerprint core, as is known in the art, is typically the maximum recurve point on a ridge curve. There may be more than one core for a fingerprint, and in those cases, all cores will be examined. A fingerprint delta is the location where three diverging ridges meet as a delta. Generally, loop patterns have one delta, whorl patterns have two deltas and arch patterns typically do not have any deltas.

Next, the cores and deltas of a search print and a file print are compared, and the ClassBoostScore is boosted based on the number of cores and deltas and their locations (FIG. 8, 850). There are four possible combinations of cores and deltas. In a first case, one print has no core and no delta and the other print has at least one core or one delta. In a second case, both the file print and the search print have one core or one delta. In a third case, both the file print and the search print have one core and one delta. In a fourth case, both the file print and the search print have two deltas and two cores.

The ClassBoostScore for the first case, where one print has no core and no delta and the other print has at least one core or one delta, is determined follows. The image quality, received as a descriptor from the minutiae match process in Stage 2 210 of FIG. 2, is checked for the print which has no core and no delta Typically, if a file print and a corresponding search print match, then if one print has a core or delta, the other print will also have a core or delta. Thus, if the quality of the print image is good, and so the classification is likely correct, then the ClassBoostScore is set to −200, indicating a low probability of a match. If, instead, the image quality of the print which has no core and no delta is poor, then ClassBoostScore is not boosted, as the classification of the poor image quality print may be inaccurate.

For the case where both prints have one core or one delta, the ClassBoostScore is calculated as follows. An offset or distance (Dis) between a singularity point in the search print and corresponding singularity point in the file print is determined. A singularity point is either a delta or a core. The ClassBoostScore is calculated using the following equation:

$$\text{ClassBoostScore} = C26 \times e^{(-C27 \times Dis)}$$

where $C26$ and $C27$ are positive numbers, and $C26$ is between 100 to 1,000 and $C27$ is between 0 to 1. In the preferred embodiment, $C26=400$ and $C27=0.0003$. Thus, the ClassBoostScore will receive a greater boost when the distance between a singularity point in the search print and a corresponding singularity point in the file print is at a minimum.

The relative distance between each mated minutia to a singularity point is then determined for both the file and search prints (FIG. 8, 840). The relative distance in the file print is assigned to a variable disf.n where n is a number of a given mated minutia. Similarly, the relative distance between the mated minutia and a singularity point in the search print is assigned to a variable diss.n. Next, the sum of the absolute distance difference (dif_dis) between the relative distance for the file print and the relative distance in the search print is calculated as follows:

dif_dis=abs(disf.1−diss.1)+abs(disf.2 −diss.2)+. . . +abs (disf.n−diss.n);

dif_dis=dis_dis/n;

If dif_dis<K1 Then dif_dis=0
Else dif_dis=dif dis−K1;
If(dif_dis<K1)

$$\text{ClassBoostScore} = C28 * e^{(-C29 \cdot dif\_dis)}$$

Else If (dif_dis>K1)

Then $\text{ClassBoostScore} = C28 * e^{(-C30 \cdot diff\_dis)}$ where $C28$–$C30$ are positive numbers, and $C28$ is between 100 and 1,000, and $C29$ and $C30$ are between 0 to 1. $C29$ is less than or equal to $C30$. In the preferred embodiment, $C28$ is equal to 1,000, $C29$ is equal to 0.1, and $C30$ is equal to 0.3. Thus, the smaller the differences in relative distances between all the mated minutiae to a singularity point in the file print as compared to the relative distances between all the mated minutiae to a singularity point in the search print, the greater the ClassBoostScore. The function $e^{-x}$ could be replaced with either a decay function or a Gaussian function or another related function.

Next, the angle of each mated minutia relative to a corresponding singularity point within the file and search print is determined. Then the ClassBoostScore is calculated by summing the absolute angle differences between the angles angls.n in the search print and the angles anglf.n in the file print as follows:

Let dif_angle=abs(anglf.1-angls.1)+. . . abs(anglf.n-angls.n);

Let dif_angle=dif_angle/n;

If dif_angle<K2

Then dif_angle=0

Else dif_angle=dif_angle-K2;
If (dif_angle<K3)
Then $$\text{ClassBoostScore} = \text{ClassBoostScore} \times e^{(-C29 \times dif\_angle)};$$

Else If (dif_angle>K3)
Then $$\text{ClassBoostScore} = \text{ClassBoostScore} \times e^{(-C30 \times dif\_angle)};$$

where anglf.n is the angle of a minutia relative to a singularity point in the file print, and angls.n is the angle of a minutia relative to a singularity point in the search print. The variable n is the number of mated minutia. Constants $K2$, $K3$ are positive numbers, and in the preferred embodiment $K2=7$, $K3=10$.

In the case where both prints have one core and one delta, either the core or delta is selected. The ClassBoostScore is then calculated as in the case above where both prints have one core or one delta.

The above calculated ClassBoostScore may be reduced if the minutiae in the file print have a different relationship to the file print core and delta then the relationship the minutiae in the search print have to the search print core and delta (FIG. 8, 830). The relationship of minutiae to a core and a delta is determined as follows. The core and delta in the file print are connected by a virtual line. Similarly, the core and delta in the search print are connected by a virtual line. The mated minutiae in the file print and the corresponding mated minutia in the search print are inspected to determine whether the file print and search print mated minutiae are located on the same side of their respective virtual lines. A count is made of the number m of file print minutiae which are on an opposite side of the file print virtual line as compared to the relationship of the search print mated minutiae to the search print virtual line. The reduced ClassBoostScore is calculated as follows:

$$\text{ClassBoostScore} = \text{ClassBoostScore} - (m \times 20)$$

The ClassBoostScore for the fourth case, where both the file print and the search print each have two cores and two deltas, is determined as follows. The lower core in the file and the lower core in the search print are selected. The ClassBoostScore is then calculated as in the case above where both prints have one core and one delta. The relationship of minutiae to the lower core and the two deltas is then determined as follows. The lower core in the file print is connected to a first one of the file print deltas by a first virtual line, and the lower core is connected to the remaining delta by a second virtual line. Similarly, the lower core and the deltas in the search print are connected by virtual lines. The mated minutiae in the file print and the corresponding mated minutia in the search print are inspected to determine whether the file print and search print mated minutiae are located on the same side of their respective virtual lines. A count is made of the number m1 of file print minutiae which are on an opposite side of the first virtual line in the file print as compared to the relationship of the search print mated minutiae to the corresponding search print virtual line. A count is then made of the number m2 of file print minutiae which are on an opposite side of the second virtual line in the file print as compared to the relationship of the search print mated minutiae to the corresponding search print virtual line. The reduced ClassBoostScore is calculated as follows:

$$\text{ClassBoostScore} = \text{ClassBoostScore} - (m1 + m2) \times 10$$

Figure 9:
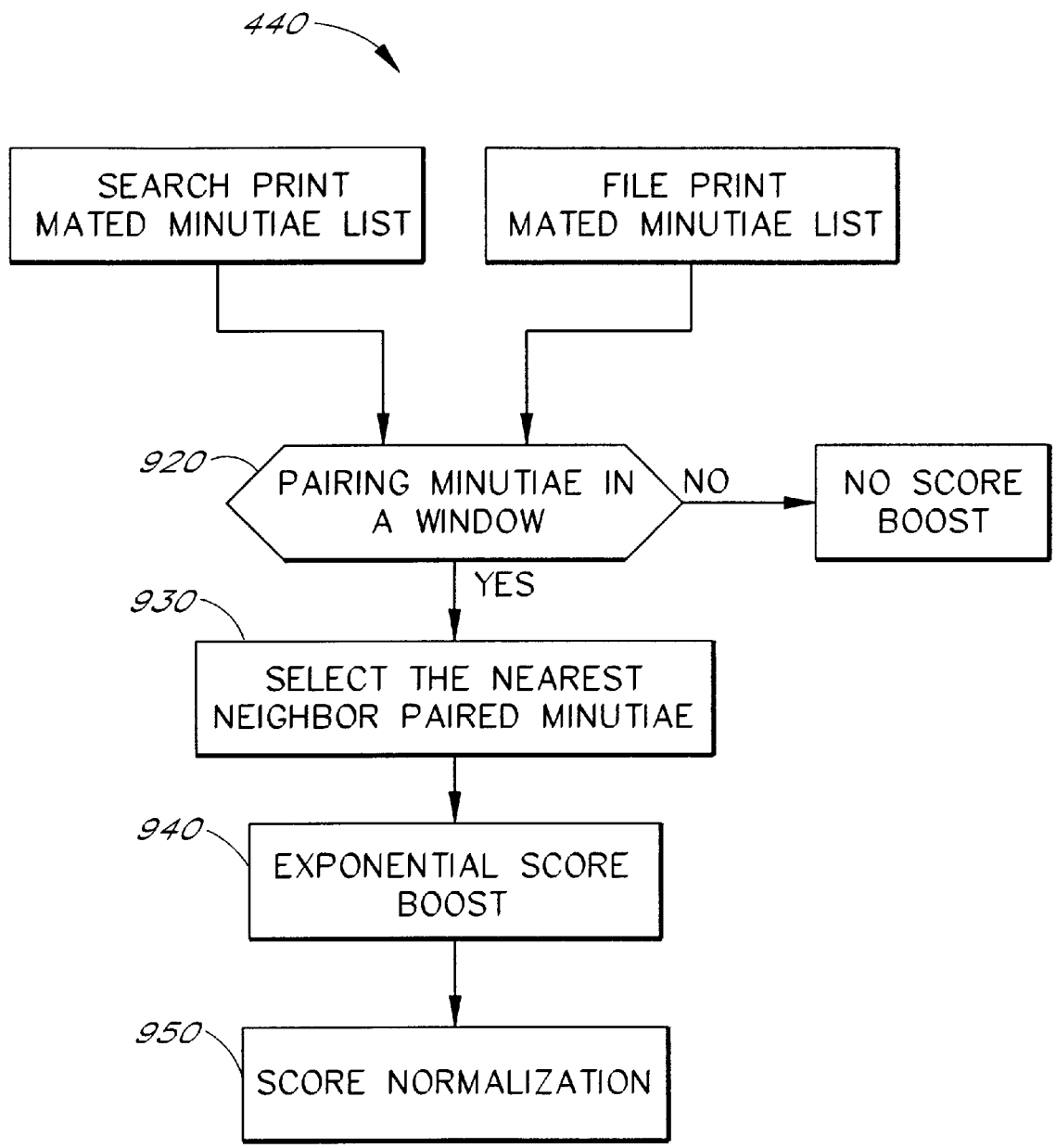
FIG. 9 is a detailed flow diagram of block 440 from FIG. 4.

Next, a correlation match boost score CorrBoostScore is calculated based on the correlation of file print minutiae features with search print minutia features for such features as the X-Y coordinates and the rotation angles (FIG. 4, 440 and FIG. 9, 440). First, for each minutia in the search print, the nearest neighboring minutia in the file print is found (FIG. 9, 920). If a minutia in the search print has several neighboring minutiae in the file print, one file print minutia is selected as the nearest neighboring minutia (FIG. 9, 930). Next, the differences x_dif, y_dif in the X and Y coordinates, as well as the differences in rotation angle angle_dif between the minutia of the search print and its nearest neighboring minutia from the file print are calculated. The correlation match boost score CorrBoostScore is calculated (FIG. 9, 940) as follows:

Let tem_dis=x x_dif+y_dif+angle_dif

If ((x_dif<K3) AND (y_dif<K3) AND (angle_dif<K4)) Then

If (tem_dis<K4) Then tem_dis=0

Then $$\text{CorrBoostScore} = 60 \times e^{(-C31 \times tem\_dis)}$$

Else CorrBoostScore=0
where C31 is a positive number between 0 to 1. In the preferred embodiment C31=0.1. The constant K3=8 and the constant K4=15 in the preferred embodiment. Thus, if a file minutia falls within an 8-pixel×8-pixel×15 scaled degrees window of its nearest neighbor in the file print, and if the rotation of the file minutia is within 15 normalized degrees of the rotation of the search minutia, then the CorrBoostScore will be boosted. Otherwise, the CorrBoostScore will be set to 0. This serves to boost the score of file prints whose minutiae have corresponding minutiae in the search print, with similar X-Y coordinate positions and rotation angles. Having file print minutiae with the same or similar X-Y coordinates and rotation angles as the search print minutiae indicates a higher probability that the file print is a true match with the search print.

Next the CorrBoostScore is normalized (FIG. 9, 950) based on the number of minutiae in the search print and in the file print, the total number of mated minutiae, and the total number (win_minutiae) of nearest neighbor minutiae falling within the 8pixel×8pixel×15 scaled degrees window. If the number of minutiae ($F_n$) in the file print is greater than the number of minutiae ($S_n$) in the search print then $$\text{CorrBoostScore} = (\text{CorrBoostScore} + \text{win\_minutiae} \times K5) \times \frac{S_n}{F_n}$$

Else CorrBoostScore = CorrBoostScore + win_minutiae × K5

If win_minutiae < $\frac{\text{No. of mated minutia}}{2}$

Then CorrBoostScore = $C32$ × CorrBoostScore where C32 is a positive number between 0 and 1. In the preferred embodiment C32=0.5 and the constant K5=50.

As defined by the above equations, the CorrBoostScore will receive a boost proportional to the number of cases where the nearest neighbor file print minutiae minutiae to each search print minutia falls within the 8pixel×8pixel×15 scaled degree window. The greater the number of such cases, the greater the magnitude of the CorrBoostScore. However, if there are more minutiae in the file print than in the search print, there is a lesser weight given to the CorrBoostScore. This is because the greater the number of minutiae in the file print, the greater the chance that there may be file print minutiae which may coincidentally have the same coordinates and rotation angles as a number of search print minutiae, even though the file print may not be a true match with the search print. Therefore, the CorrBoostScore will be decreased by the ratio of minutiae in the search print to minutiae in the file print. Furthermore, if more than half of the mated minutiae fall outside the window, the CorrBoostScore will be cut in half as there is a lower probability that there is a match.

A totaled boost score TotalBoostScore is now calculated. The TotalBoostScore is equal to the summation of all the calculated boosted scores above as illustrated by the following equation.

$$\text{TotalBoostScore} = \text{RidgeCountBoostScore} + \text{RidgeTraceBoostScore} + \text{RidgePropBoostScore} + \text{ClassBoostScore} + \text{CorrBoostScore}$$

A new match score list is then generated in descending order according to the TotalBoostScore plus the original match score received from Stage 2 210 of FIG. 2. The new match score list is then sent to the task manager, which may store and/or report the results.

The expert matcher finger print system as described above can match a search print to a file print with an approximately 50% reduction in error as compared to prior art techniques which rely solely on matching individual minutiae. Therefore, incorporating the expert matcher into an automated fingerprint matching system allows the automated system to be used more effectively, accurately and efficiently.

The fingerprint matching system described herein is an exemplary embodiment of a fingerprint matching system in accordance with the present invention, and is not intended to limit the scope of the invention. Thus, the breadth and scope of the invention should be defined only in accordance with the following claims and their equivalents.

What is claimed is:

1. A method of matching a search print with one or more file prints stored in a database system, each of said search and file prints including minutiae, said method comprising the steps of:

performing a first comparison of minutia of at least a first search print with minutia of a first set of file prints stored in said database system;

identifying file prints within said first set which are potential matches with said first search print based on said minutia comparison to produce a down-selected set of file prints;

performing a second comparison of said search print with at least a portion of said down-selected file prints, said second comparison including at least the comparison of a first number of ridges between at least a first minutia and a second minutia in said search print to a second number of ridges between at least a corresponding first minutia and a corresponding second minutia in at least a first of said down-selected file prints, said corresponding first minutia in said first file print having coordinates corresponding to said first minutia in said search print and said corresponding second minutia in said first file print having coordinates corresponding to coordinates of said second minutia of said search print;

generating a first result of said second comparison;

determining a first starting angle of a file print ridge connecting a first file print ridge trace minutia to a second file print ridge trace minutia;

determining a first ending angle of said file print ridge connecting said first file print ridge trace minutia to said second file print ridge trace minutia;

determining a second starting angle of a search print ridge connecting a corresponding first search print ridge trace minutia to a second search print ridge trace minutia;

determining a second ending angle of said search print ridge connecting said corresponding first search print ridge trace minutia to said second search print ridge trace minutia;

comparing said first starting angle to said second starting angle;

comparing said first ending angle to said second ending angle;

generating a second result based on said comparison of said first starting angle to said second starting angle and said comparison of said first ending angle to said second ending angle;

determining a first length of a file print ridge connecting a first file print minutia to a second file print minutia;

determining a second length of a search print ridge connecting a first search print minutia to a second search print minutia;

comparing said file print ridge length and said search print ridge length; and providing a first result of said comparison of said file print ridge length and said search print ridge length.

2. The method of matching a search print with one or more file prints, as defined in claim 1, further including the steps of:

determining an offset between a first singularity in said search print and a corresponding first singularity in at least one file print; and generating a second result based on said offset.

3. The method of matching a search print with one or more file prints, as defined in claim 1, further including the steps of:

determining a first distance between a singularity in said search print and at least one minutia in said search print;

determining a second distance between a corresponding singularity in at least one file print and at least one corresponding minutia in said at least one file print;

performing a third comparison between said first distance and said second distance; and generating a second result based on said third comparison.

4. The method of matching a search print with one or more file prints, as defined in claim 1, further including the steps of:

determining a first angle between a singularity in said search print and at least on minutia of said search print;

determining a second angle between a corresponding singularity in at least one file print and a minutia of said at least one file print corresponding to said at least one minutia in said search print;

comparing said first angle and said second angle; and generating a second result based on said angle comparison.

5. The method of matching a search print with one or more file prints, as defined in claim 1, including the steps of:

determining a quantity of minutiae of said search print which are located on a first side of a line defined by a first search print singularity and a second search print singularity;

determining a quantity of minutiae of at least one file print which are located on a corresponding first side of line defined by a corresponding first file print singularity and a corresponding second file print singularity;

comparing said quantity of said search print minutiae and said quantity of said file print minutiae; and generating a second result based an said comparison of said quantity of said search print minutiae and said quantity of said file print minutiae.

6. The method of matching a search print with one or more file prints, as defined in claim 5, wherein said first search print singularity is a core.

7. The method of matching a search print with one or more file prints, as defined in claim 5, wherein said first search print singularity is a delta.

8. The method of matching a search print with one or more file prints, defined in claim 1, including the step of performing a comparison of a first classification of said at least one file print with a second classification of said search print and providing a result of said classification comparison.

9. The method of matching a search print with one or more file prints, as defined in claim 1, including the steps of:

determining a first direction of a file print ridge connecting at least one file print minutia to another minutia;

determining a second direction of a search print ridge connecting a corresponding at least one search print minutia to another search print minutia;

comparing said first direction to said second direction; and generating a second result based on said comparison of said first direction to said second direction.

10. The method of matching a search print with one or more file prints, as defined in claim 1, including the steps of:

determining an offset between at least one file print ridge connecting a first ridge file print trace minutia to a second file print ridge trace minutia and a search print ridge connecting a corresponding at least one search print ridge trace minutia to a second search print ridge trace minutia; and generating a second result based on said offset.

11. A method of matching a search print with one or more file prints, comprising the steps of:

performing a first comparison of minutia of at least a first search print with minutia of a first set of file prints stored in a database system;

identifying file prints within said first set which are potential matches with said first search print based on said minutia comparison to produce a down-selected set of file prints;

performing a second comparison of said search print with at least a portion of said down-selected file prints, said second comparison including at least the comparison of a first number ridges between at least a first minutia and a second minutia in said search print to a second number of ridges between at least corresponding first minutia and a corresponding second minutia in at least a first of said down-selected file prints, said corresponding first minutia in said first file print having coordinates corresponding to said first minutia in said search print and said corresponding second minutia in said first file print having coordinates corresponding to coordinates of said second minutia of said search print;

comparing a first direction of a search print ridge with a first direction of a file print ridge;

determining a quantity of minutiae of a search print which are located on a first side of a first search print singularity and a second search print singularity;

determining a quantity of minutiae of a file print which are located on a corresponding first side defined by a corresponding first file print singularity and a corresponding second file print singularity;

comparing said quantity of said search print minutiae and said quantity of said file print minutiae; and providing a result based on said comparison of said minutiae quantities.

12. The method of matching a search print with one or more file prints, as defined in claim 11, further including the steps of:

determining an offset between a location of at least one singularity in said search print and a location of a corresponding singularity in said file print;

generating a match indicator based on said offset; and storing said second match indicator.

13. The method of matching a search print with one or more file prints, as defined in claim 11, including the steps of:

determining a first angle between at least one singularity in said search print and at least one minutia in said search print;

determining a second angle between a corresponding at least one singularity in said file print and corresponding at least one minutia in said file print;

comparing said first angle and said second angle; and generating a match indicator based on said comparison of said first angle and said second angle.

* * * * *

UNITED STATES PATENT AND TRADEMARK OFFICE
CERTIFICATE OF CORRECTION

PATENT NO. : 5,960,101
DATED : September 28, 1999
INVENTOR(S) : Lo et al.

It is certified that error appears in the above-identified patent and that said Letters Patent is hereby corrected as shown below:

Column 24,
Line 43, please delete "an said" and insert therefore, -- on said --.
Line 53, please delete "prints, defined" and insert therefore, -- prints as defined --.

Column 25,
Line 25, please delete "ridges between" and insert therefore, -- number of ridges between --.
Line 27, please delete "at least corresponding" and insert therefore, -- least a corresponding --.

Signed and Sealed this

Twenty-first Day of October, 2003

JAMES E. ROGAN
*Director of the United States Patent and Trademark Office*